(12) United States Patent
Kihara et al.

(10) Patent No.: US 6,321,565 B1
(45) Date of Patent: Nov. 27, 2001

(54) METHOD AND APPARATUS FOR THE PRODUCTION OF HEAVY OXYGEN WATER

(75) Inventors: Hitoshi Kihara; Hiroshi Tachibana; Hiroshi Kawakami; Shigeru Hayashida, all of Tokyo (JP)

(73) Assignee: Nippon Sanso Corporation, Tokyo (JP)

(*) Notice: Subject to any disclaimer, the term of this patent is extended or adjusted under 35 U.S.C. 154(b) by 0 days.

(21) Appl. No.: 09/492,285

(22) Filed: Jan. 27, 2000

(30) Foreign Application Priority Data

Jan. 29, 1999 (JP) .................................. 11-023148

(51) Int. Cl.$^7$ ........................................................ F25J 3/00
(52) U.S. Cl. ................................................................ 62/643
(58) Field of Search ................................ 62/919, 643, 648

(56) References Cited

U.S. PATENT DOCUMENTS

| | | | | |
|---|---|---|---|---|
| 4,221,774 | * | 9/1980 | Spevak | 423/580 |
| 4,788,051 | * | 11/1988 | Spevak | 423/579 |
| 5,057,225 | * | 10/1991 | van Hook et al. | 210/640 |

* cited by examiner

Primary Examiner—William Doerrler
Assistant Examiner—Malik N. Drake
(74) Attorney, Agent, or Firm—Burns Doane Swecker & Mathis LLP

(57) ABSTRACT

Oxygen starting material, which already contains heavy isotopes of oxygen, is enriched in the heavy isotopes of oxygen by means of cryogenic distillation in an oxygen distillation column system 1A, then water containing a high concentration of the above-mentioned heavy isotopes of oxygen is formed by adding hydrogen to the enriched product and reacting them in a reactor system 3A. This formed water is distilled in the water distillation column system 4A and, thereby, heavy oxygen water enriched in the above-mentioned heavy isotopes of oxygen is produced.

32 Claims, 11 Drawing Sheets

METHOD AND APPARATUS FOR THE PRODUCTION OF HEAVY OXYGEN WATER

BACKGROUND OF THE INVENTION

1. Field of the Invention

The present invention relates to a method for producing water (heavy oxygen water) highly enriched in $^{17}O$ or $^{18}O$ (hereinafter referred to as the heavy isotopes of oxygen) which are isotopes of oxygen present in water. More specifically, the present invention relates to a method in which oxygen is enriched in $^{16}O^{17}O$, $^{16}O^{18}O$, $^{17}O^{17}O$, $^{17}O^{18}O$, and $^{18}O^{18}O$ by means of cryogenic distillation, then water is produced from the enriched product, and then water which is further enriched in the oxygen isotope $^{17}O$ or $^{18}O$ is produced by means of water distillation.

In addition, the present invention relates to a method of producing water which is enriched in the oxygen isotope $^{17}O$ or $^{18}O$, and which has a constitution in which the hydrogen isotopes are present in a ratio approximating their natural abundance ratio. In addition, alternatively, the present invention relates to a method of producing water having a hydrogen isotope constitution which contains deuterium (D) in a ratio lower than the natural abundance ratio. In addition, alternatively, the present invention relates to a method of producing water having a hydrogen isotope constitution which contains deuterium (D) in a ratio higher than the natural abundance ratio.

This application is based on patent application No. Hei 11-23148 filed in Japan, the content of which is incorporated herein by reference.

2. Description of the Related Art

Natural oxygen contains $^{16}O$ at a ratio of 99.7591% (atomic percent, hereinafter the same), $^{17}O$ at a ratio of 0.037%, and $^{18}O$ at a ratio of 0.204%.

Among these, the heavy isotope $^{18}O$ is used as a tracer in fields such as agriculture, biology, and medicine.

In addition, in the same way, since the heavy isotope $^{17}O$ has nuclear magnetic moment, it is used in research of oxygen compounds using nuclear magnetic resonance and the like.

As enrichment methods for these heavy isotopes of oxygen, there are distillation, thermal diffusion, chemical exchange (reactions), and the like. However, as a method of production with low cost and high volume, distillation is generally used. As the distillation method, there are methods which use water, NO, CO or oxygen as the starting material.

However, the above mentioned conventional techniques have the following problems.

In the above-mentioned water distillation method, it is easy for water ($HD^{16}O$) containing the light isotope ($^{16}O$) and deuterium to be mixed with the heavy isotope-enriched product.

FIG. 14 shows an example of enrichment in heavy isotopes of oxygen by means of water distillation using water containing oxygen in which each of the isotopes is present in the above-mentioned natural abundance ratios. In this example, the fraction obtained at the bottom of the column which was enriched in $H_2^{18}O$ to approximately 1.1% was also enriched in $HD^{16}O$ to approximately 0.2%.

Since the relative volatility of $H_2^{16}O/HD^{16}O$ is greater than the relative volatility of $H_2^{16}O/H_2^{18}O$, enrichment in $HD^{16}O$ is comparatively easier to carry out. Therefore, it is believed that in the above-mentioned example, enrichment in $HD^{16}O$ hinders enrichment in $H_2^{17}O$ and $H_2^{18}O$.

Dostrovsky et al reported obtaining $H_2^{18}O$ of 99% or greater by means of water distillation (I. Dostrovsky and M. Epstein, "The production of stable isotopes of oxygen" Analytical Chemistry Symposia Series, Vol. 11, pp. 693–702 (1982)). However, as mentioned above, when enriching in $H_2^{17}O$ and $H_2^{18}O$, usually, enrichment in water molecules ($HD^{16}O$, etc.) containing $^{16}O$ and deuterium also occurs at the same time, this hinders the enrichment in $H_2^{17}O$ and $H_2^{18}O$, and it is difficult to industrially obtain $H_2^{18}O$ having a purity of 99% or greater. The purity of commercially available $H_2^{18}O$ is approximately 97%.

In addition, because the latent beat of vaporization of water is comparatively large (for example, it is about six times greater than that of oxygen), the apparatus for water distillation is comparatively large and energy consumption is great. For this reason, there is a tendency for the apparatus costs and operation costs to be large for water distillation methods.

In NO distillation methods as well, there is the problem that it is relatively easy for the compound NO ($^{15}N^{16}O$) which contains the heavy isotope of nitrogen and the $^{16}O$ to be mixed with the obtained heavy isotope-enriched product, and it is difficult to obtain an enriched product having a high concentration of heavy oxygen isotopes.

In oxygen distillation, since the abundance ratio of $^{17}O$ and $^{18}O$ in natural oxygen is low, the abundance ratio of $^{17}O^{17}O$, $^{17}O^{18}O$ and $^{18}O^{18}O$ is extremely low. For this reason, the major proportion of oxygen molecules which contain heavy isotopes are $^{16}O^{17}O$ and $^{16}O^{18}O$.

In this way, since most heavy isotope containing-oxygen molecules contain $^{16}O$, in oxygen distillation, even when the enrichment proceeds to close to 100% of heavy isotope containing-oxygen molecules, the enrichment rate for the heavy isotopes, that is $^{17}O$ and $^{18}O$, is a low value of 50% or less.

SUMMARY OF THE INVENTION

In view of the above-mentioned situations, an object of the present invention is the provision of a method and an apparatus with which it is possible to carry out enrichment in the heavy isotopes of oxygen to a high concentration and which can be implemented at low cost.

The method of producing heavy oxygen water of the present invention comprises enriching an oxygen starting material, which contains heavy isotopes of oxygen, in heavy isotopes of oxygen by means of cryogenic distillation; and producing water containing a high concentration of the above-mentioned heavy isotopes of oxygen by adding hydrogen to the enriched product and reacting them.

In addition, the method of producing heavy oxygen water of the present invention comprises enriching an oxygen starting material, which already contains heavy isotopes of oxygen, in heavy isotopes of oxygen by means of cryogenic distillation, then forming water containing a high concentration of the above-mentioned heavy isotopes of oxygen by adding hydrogen to the enriched product and reacting them, and producing heavy oxygen water enriched in the above-mentioned heavy isotopes of oxygen by means of the distillation of the formed water.

In addition, in the method of the present invention, the above-mentioned heavy isotopes of oxygen may be either of $^{17}O$ or $^{18}O$ or they may be both $^{17}O$ and $^{18}O$.

In addition, the method of the present invention comprises conducting the above-mentioned cryogenic distillation of oxygen and the above-mentioned distillation of the formed water using a distillation column packed with structured packing.

In addition, the method of the present invention comprises enriching oxygen in the molecular isotopes of oxygen of $^{16}O^{18}O$, $^{16}O^{17}O$, $^{17}O^{17}O$, $^{17}O^{18}O$, and $^{18}O^{18}O$, wherein, as the method for the above-mentioned cryogenic distillation of oxygen, a distillation method is used which comprises supplying an oxygen starting material to a distillation column which has been packed with structured packing; bringing about vapor-liquid contact between a descending liquid and an ascending vapor mainly on the surface of the above-mentioned structured packing within the above-mentioned distillation column; at which time the liquid and the vapor flow in mutually opposite directions over the surface of the above-mentioned structured packing along the main flow direction which is along the direction of the column axis, and at the same time, mixing of the liquid and/or the gas (vapor) in a direction at right angles to the above-mentioned main flow direction is promoted and mass transfer is accomplished.

In addition, in the method of the present invention, the cryogenic distillation of oxygen is conducted such that the density corrected superficial velocity (the superficial F factor) within the column is 0.5 m/s(kg/m$^3$)$^{1/2}$ or greater and 2.0 m/s(kg/m$^3$)$^{1/2}$ or less, and preferably 0.8 m/s(kg/m$^3$)$^{1/2}$ or greater and 1.7 m/s(kg/m$^3$)$^{1/2}$ or less.

In addition, the present invention includes enriching oxygen in the heavy isotopes of oxygen by means of cryogenic distillation of the above-mentioned oxygen starting material which contains heavy isotopes of oxygen, then, carrying out isotope scrambling with the obtained oxygen heavy isotope-enriched product, and conducting further enrichment in at least one of the types of heavy oxygen isotopes enriched by means of the distillation, followed by low temperature distillation or by hydrogenation. Here, the isotope scrambling refers to a situation in which there are molecules present which contain a plurality of types of isotopes, and each molecule randomly exchanges atoms with those of other molecules having the same structure.

The apparatus with which this is carried out is called an isotope scrambler. As the method for the scrambling, the method described in Japanese Patent Application No. Hei 11-150733 can be used.

The method of the present invention comprises enriching heavy oxygen water containing heavy isotopes of oxygen $^{17}O$ and $^{18}O$, wherein, as the method for the distillation of the above-mentioned formed water, a distillation method is used which comprises supplying the formed water to a distillation column packed with structured packing; bringing about vapor-liquid contact within the above-mentioned distillation column between the descending liquid and the ascending vapor mainly on the surface of the above-mentioned structured packing; at which time the liquid and the vapor flow in mutually opposite directions over the surface of the above-mentioned structured packing along the main flow direction which is along the direction of the column axis, and at the same time, mixing of the liquid and/or the vapor in a direction at right angles to the above-mentioned main flow direction is promoted and mass transfer is accomplished.

In addition, the present invention includes enriching heavy oxygen water containing at least one type of heavy oxygen isotope by means of the distillation of the heavy oxygen water containing the above-mentioned heavy isotopes of oxygen. Then, isotope scrambling is carried out with the obtained heavy oxygen water enriched in the heavy isotopes of oxygen, further enrichment in at least one of the types of the heavy oxygen water occurs, and then distillation is carried out.

In addition, in the method of the present invention, as the hydrogen added to the above-mentioned enriched product, hydrogen in which the concentration of deuterium is already lower compared with the concentration present in natural hydrogen may be used.

In addition, in the method of the present invention, the above-mentioned hydrogen in which the concentration of deuterium has been reduced may be obtained by means of supplying a hydrogen starting material to a hollow metal membrane of palladium-silver alloy and causing the above-mentioned hydrogen starting material to permeate through the above-mentioned membrane.

In addition, in the method of the present invention, the above-mentioned hydrogen in which the concentration of deuterium has been reduced may be obtained by a method in which hydrogen starting material is stored in a hydrogen storing alloy and then the stored hydrogen is recovered by desorption from the alloy. In addition, in the method of the present invention, hydrogen which has been enriched in deuterium in advance may be used as the hydrogen added to the above-mentioned enriched product.

In addition, in the method of the present invention, water formed by reacting the above-mentioned hydrogen enriched in deuterium and the above-mentioned enriched product is electrolyzed, heavy isotope molecules of oxygen are produced and the deuterium is recovered and reused.

In addition, the apparatus for producing heavy oxygen water of the present invention has an oxygen distillation column system for enriching oxygen in the heavy isotopes of oxygen by cryogenic distillation of an oxygen starting material which contains heavy isotopes of oxygen, and a reactor system for producing water highly enriched in the above-mentioned heavy isotopes of oxygen by means of adding hydrogen to the obtained enriched product and reacting them.

In addition, the apparatus for producing heavy oxygen water of the present invention possesses an oxygen distillation column system for enriching oxygen in heavy isotopes of oxygen by means of cryogenic distillation of an oxygen starting material already containing heavy isotopes of oxygen; a reactor system for forming water which is highly enriched in the above-mentioned heavy isotopes of oxygen by means of adding hydrogen to the above-mentioned enriched product and causing them to react; and a water distillation column system for producing water enriched in the above-mentioned heavy isotopes of oxygen by means of distillation of the above-mentioned formed water.

In addition, in the apparatus of the present invention, the above-mentioned oxygen distillation column system and/or the above-mentioned water distillation column system may have one or a plurality of distillation columns packed with structured packing.

In addition, as the above-mentioned structured packing, structured packing (promoting-fluid-dispersion type structured packing) is used which has a structure and form such that vapor-liquid contact occurs within the above-mentioned distillation columns between the descending liquid and the ascending vapor mainly on the surface of the above-mentioned structured packing, at which time, the liquid and the vapor flow in mutually opposite directions over the surface of the above-mentioned structured packing along the main flow direction (which is along the direction of the column axis) and, simultaneously, mixing of the liquid and/or the vapor in a direction perpendicular to the above-mentioned main flow direction is promoted.

In addition, the specific surface area of the packing of the above-mentioned oxygen distillation column system and/or the water distillation column system is from 350 m²/m³ to 1200 m²/m³, and preferably from 500 m²/m³ to 750 m²/m³.

In addition, in the apparatus of the present invention, a plate fin type condenser maybe provided at the top of the above-mentioned distillation column, and a coil-type reboiler or a plate fin type reboiler may be provided within the above-mentioned column in the vicinity of the bottom. In addition, a pipe is connected to the inlet side of a first conduit of the above-mentioned condenser for introducing at least a part of the output gas from the top of the distillation column into the above-mentioned conduit of the above-mentioned condenser. A pipe is connected to the outlet side of the first conduit for guiding liquid output from this conduit into the top of the above-mentioned distillation column again. A pipe for circulating a medium for heat exchange is connected to the second conduit of the condenser, this pipe for circulating a medium for heat exchange is connected to the above-mentioned coil type reboiler or plate fin type reboiler, and a circulation means is provided in the above-mentioned pipe for circulating the medium for heat exchange within the above-mentioned pipe.

In addition, the above-mentioned plate fin type reboiler may be provided at the outside of the bottom of the above-mentioned distillation column.

In addition, the above-mentioned oxygen distillation column system and/or the above-mentioned water distillation column system may have a plurality (n) of distillation columns ($A_1 \sim A_n$), and the bottom of the column $A_k$ (k: a natural number of n-1 or lower) and the top of the column $A_{k+1}$ are connected by piping via a liquid transfer means which sends liquid output from the column $A_k$ to the column $A_{k+1}$, and the lower part of the column $A_k$ and the top of the column $A_{k+1}$ are connected by piping for guiding gas output from the column $A_{k+1}$ to the column $A_k$.

In addition, the top of the above-mentioned column $A_1$ may be provided with a condenser and the bottom of the above-mentioned column $A_{k+1}$, may be provided with a reboiler.

In addition, a circulation system for a medium for heat exchange which connects a second conduit of the above-mentioned condenser and a second conduit of the above-mentioned reboiler may be provided, and a circulation means for circulating the medium for heat exchange may be provided somewhere along the above-mentioned circulation system.

As the above-mentioned circulation means, it is possible to use an ordinary temperature compressor, and in that case, a heat exchanger is provided for performing heat exchange between the medium for heat exchange at the inlet side of the above-mentioned ordinary temperature compressor and the medium for heat exchange at the outlet side of the above-mentioned ordinary temperature compressor.

As the above-mentioned circulation means, a low temperature compressor may be used, and in that case, it is not necessary to provide a heat exchanger. In addition, a low temperature liquefied gas pump may also be used.

In addition, in the apparatus for producing heavy oxygen water of the present invention, the oxygen distillation column system for enriching oxygen in heavy isotopes of oxygen by means of cryogenic distillation of an oxygen starting material containing heavy isotopes of oxygen, and the distillation column system for heavy oxygen water in which heavy oxygen water is enriched by distillation of heavy oxygen water containing heavy isotopes of oxygen may have a plurality of columns for the above-mentioned distillation processes, and an isotope scrambler may be provided in any one of the columns or between any of the columns of the above-mentioned plurality of columns.

DESCRIPTION OF THE EMBODIMENTS

Figure 1:
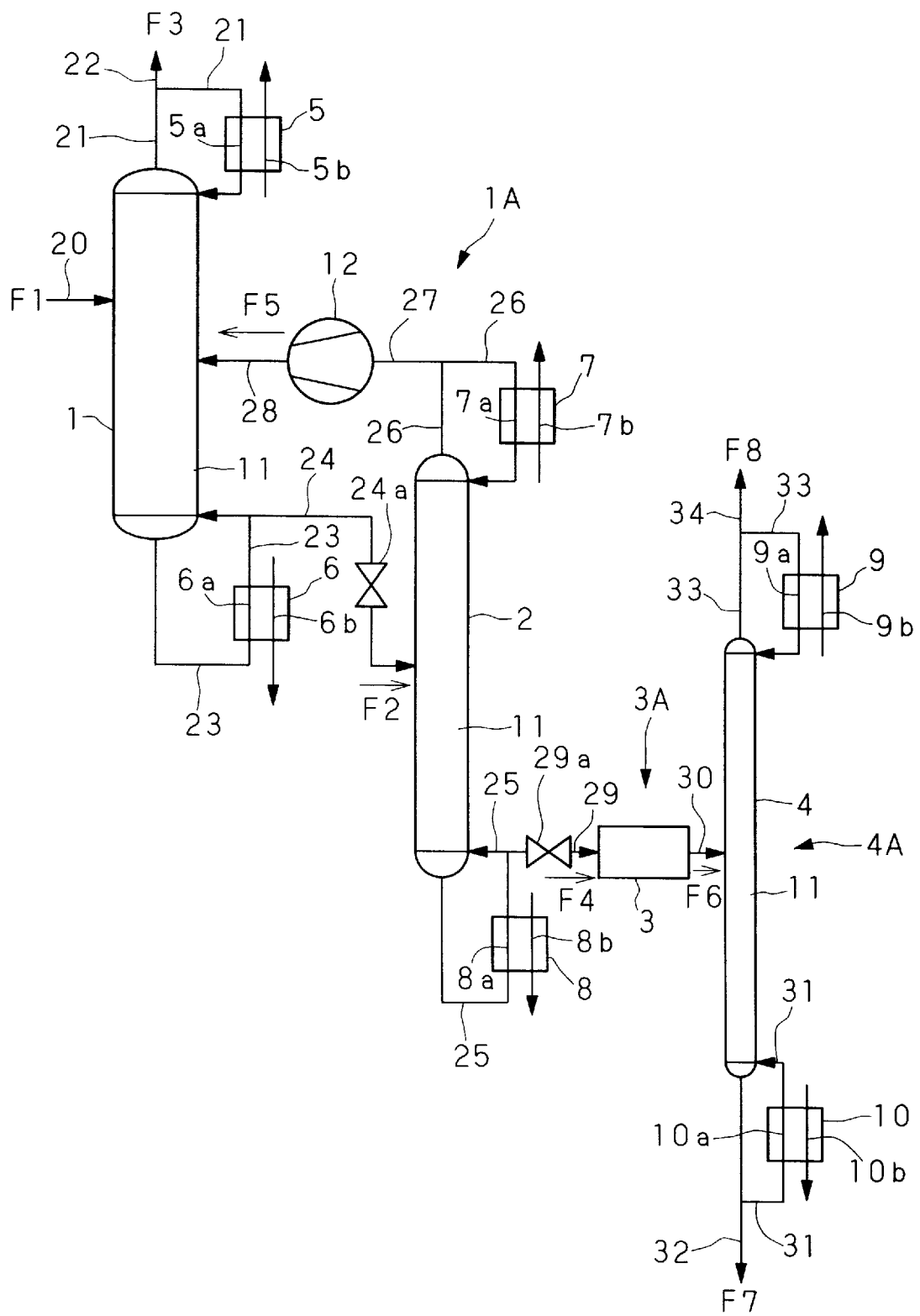
FIG. 1 is a schematic structural diagram showing an embodiment of the apparatus for producing heavy oxygen water of the present invention.

FIG. 1 shows an embodiment of the apparatus for producing heavy oxygen water of the present invention. The production apparatus shown here possesses an oxygen distillation column system 1A for enriching oxygen in heavy isotopes of oxygen by means of cryogenic distillation of an oxygen starting material; a reactor system 3A for forming water highly enriched in the above-mentioned heavy isotopes of oxygen by means of adding hydrogen to an enriched product enriched by means of the distillation column system 1A and causing them to react; and a water distillation column 4A for producing water enriched in the above-mentioned heavy isotopes of oxygen by means of distillation of the formed water.

The oxygen distillation column system 1A possesses first and second oxygen distillation columns 1 and 2 as main components. The reactor system A3 possesses a reactor 3 as a main component. The water distillation column system 4A possesses a water distillation column 4 as a main component.

The first and second oxygen distillation columns 1 and 2 and water distillation column 4 are packed with structured packing 11.

As the structured packing 11, non-promoting-fluid-dispersion type structured packing and/or promoting-fluid-dispersion type structured packing can be suitably used.

Non-promoting-fluid-dispersion type structured packing has a shape and structure with which the liquid descending within the distillation column and the vapor ascending within the column flow in opposition to one another along the surface of the packing and vapor-liquid contact occurs without the promotion of mixing of the liquid and gas in the horizontal cross-section direction with respect to the column axis. As examples, a packing material in which a large number of plates formed from aluminum, copper, alloy of aluminum and copper, stainless steel, various types of plastic, or the like are positioned parallel to the direction of the main flow (the direction of the column axis) can be mentioned.

Here, the main flow indicates the descending liquid and the ascending vapor which occurs along the direction of the column axis with the distillation column, therefore, it indicates the flow in the direction of the column axis with respect to the flow of mass transfer which is produced at the liquid-vapor interface (in other words, the boundary layer) at the surface of the packing.

Figure 2:
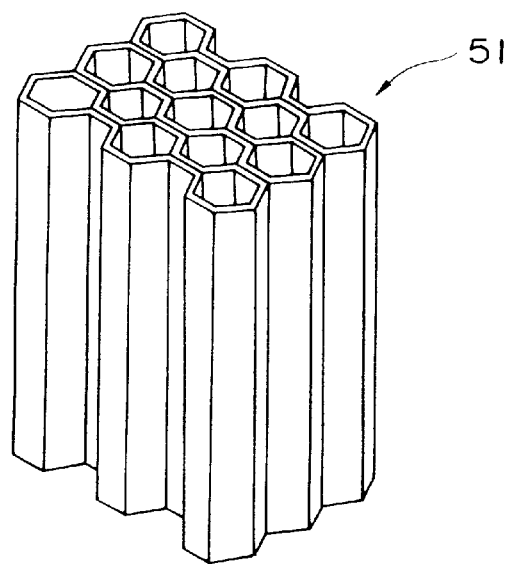
FIG. 2 is a perspective view showing an example of non-promoting-fluid-dispersion type structured packing which can be used in the apparatus shown in FIG. 1.
Figure 3:
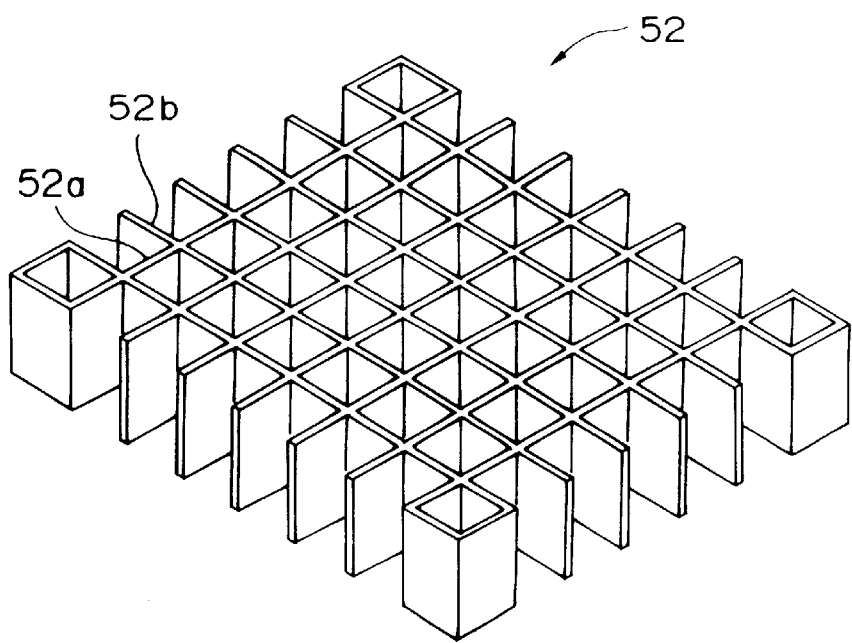
FIG. 3 is a perspective view showing another example of non-promoting-fluid-dispersion type structured packing which can be used in the apparatus shown in FIG. 1.

Examples of typical non-promoting-fluid-dispersion type packing materials are shown in FIG. 2 and FIG. 3.

Figure 4:
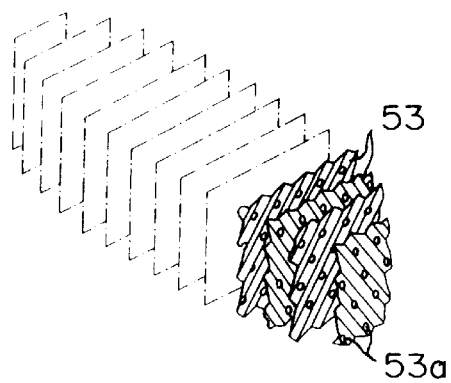
FIG. 4 is a perspective view showing an example of promoting-fluid-dispersion type structured packing which is used in the apparatus shown in FIG. 1.
Figure 7:
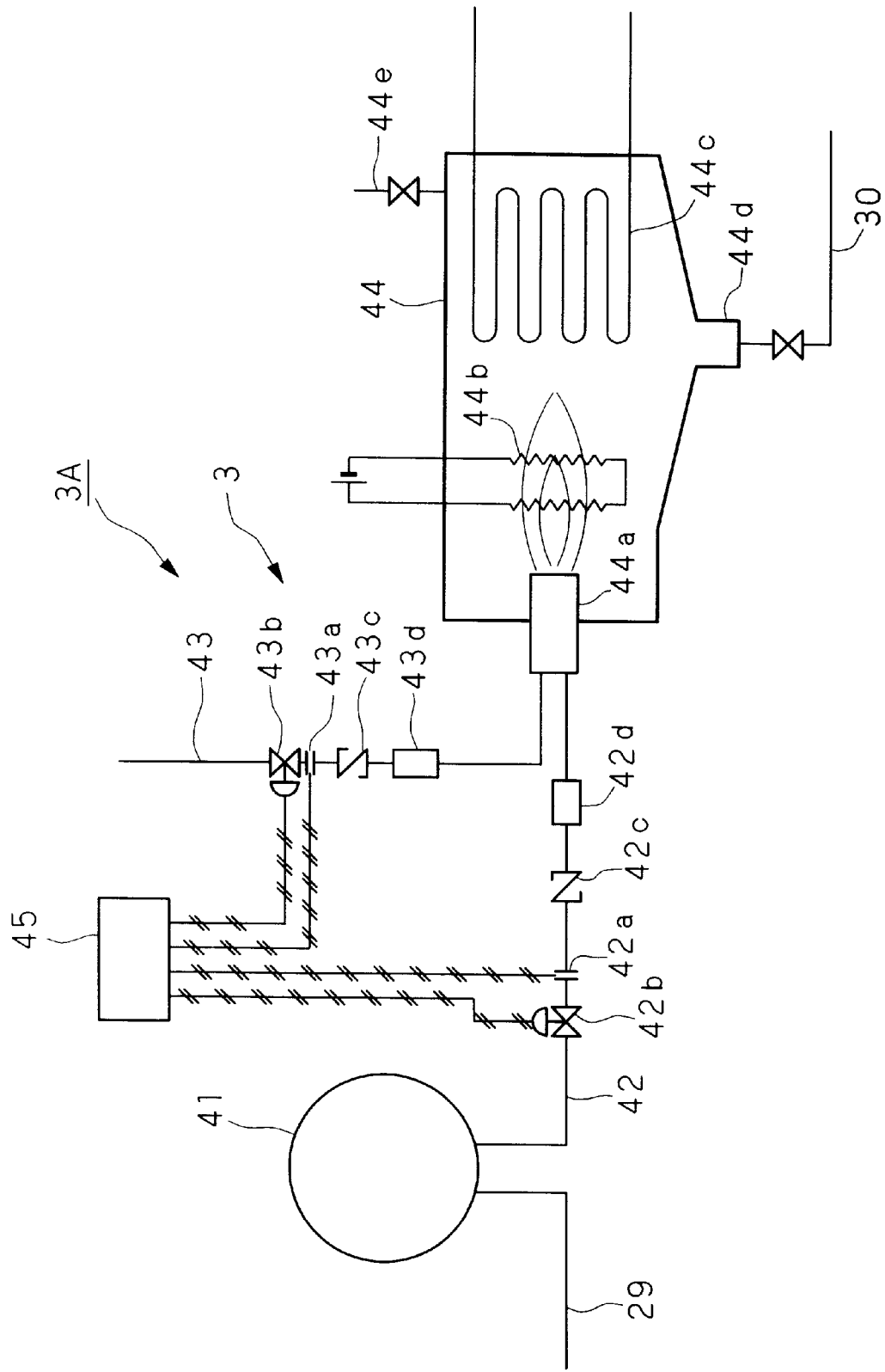
FIG. 7 is a schematic structural diagram showing the reactor used in the apparatus shown in FIG. 1.

FIG. 2 is FIG. 7 disclosed in Japanese Utility Model Application, First Publication No. Sho 56-20624; and FIG. 3 is FIG. 4 disclosed in Japanese Utility Model Application, First Publication No. Sho 51-45935.

The non-promoting-fluid-dispersion type structured packing 51 shown in FIG. 2 is a honeycomb structure comprising plates parallel to the direction of the axis of the column.

In addition, the non-promoting-fluid-dispersion type structured packing 52 shown in FIG. 3 is a lattice structure comprising a plurality of mutually parallel plates 52a and a plurality plates 52b which are arranged at right angles with respect to the plates 52a, and this lattice structure is positioned along the direction of the column axis.

Promoting-fluid-dispersion type structured packing has a shape and structure with which vapor-liquid contact occurs mainly on the surface of the above-mentioned structured packing between the liquid descending within the column and the vapor ascending within the column, at which time, the liquid and the gas flow in opposition to one another on the surface of the above-mentioned structured packing in the direction of the main flow which is along the direction of the column axis, and at the same time, mixing of the liquid and/or the vapor in a direction at right angles to the above-mentioned main flow direction is promoted and vapor-liquid contact occurs. These are called structured packing or regular packing in which thin plates of aluminum, copper, aluminum-copper alloy, stainless steel, various plastics, or the like are formed into a variety of regular forms, and then made into a laminated block.

Figure 5:
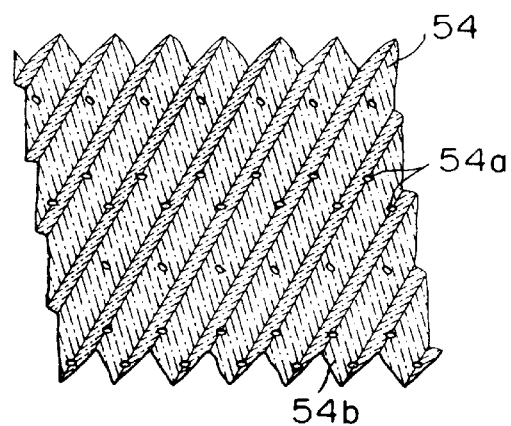
FIG. 5 is a perspective view showing another example of promoting-fluid-dispersion type structured packing which is used in the apparatus shown in FIG. 1.
Figure 6:
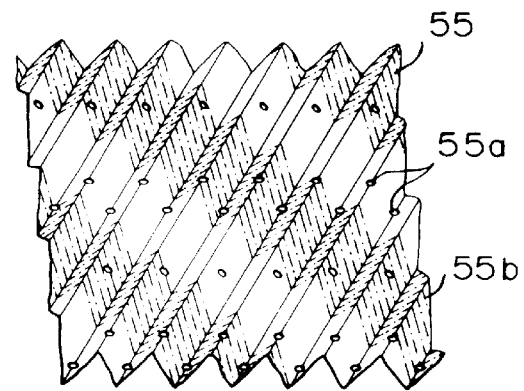
FIG. 6 is a perspective view showing another example of promoting-fluid-dispersion type structured packing which is used in the apparatus shown in FIG. 1.

Typical examples of promoting-fluid-dispersion type structured packing are shown in FIGS. 4 to 6 The example shown in FIG. 4 was disclosed in Japanese Examined Patent Application, Second Publication No. Sho 57-36009. The example shown in FIG. 5 was disclosed in Japanese Unexamined Patent Application, First Publication No. Sho 54-16761. The example shown in FIG. 6 was disclosed in Japanese Unexamined Patent Application, First Publication No. Sho 54-15554.

All of the examples shown in these figures show the form of a wave-shaped thin plate which is a structural component of this type of packing. Small holes (references 53a, 54a, and 55a in the figures) having a diameter of 2~4 mm are punched in a thin plate of metal such as aluminum having a thickness of 0.1~0.3 mm with a fixed regular distribution, which is then molded into a wave shape.

In the promoting-fluid-dispersion type structured packing 53 shown in FIG. 4, a plurality of wave-shaped thing plates are disposed parallel to the column axis and made into the form of a block by layering the plates so that they come into contact with one another. The wave-shaped grooves in each of the thin plates are inclined with respect to the column axis, and neighboring wave-shaped thin plates are disposed so that the direction of their wave-shaped grooves intersect one another. In addition, a plurality of holes 53a are provided in the thin plates. When the thin plates are disposed perpendicular with respect to the horizontal plane, the holes are provided with an interval of spacing therebetween and form a plurality of rows along a direction which is at right angles to the column axis. In the promoting-fluid-dispersion type structured packing 53 having this type of structure, the extent of the packing's ability to promote fluid distribution will vary depending on the size and number of holes 53a, the distribution of the plurality of holes 53a provided in the wave-shaped thin plates, and the like. Accordingly, many inventions have been proposed which are characterized by the selection and combination of these conditions.

FIG. 5 shows an example of a structural unit of another promoting-fluid-dispersion type structured packing. In the promoting-fluid-dispersion type structured packing 54 shown here, a thin plate is pressed in a wave shape to form wave-shaped grooves. In addition, this example has the feature that extremely small wave-shaped grooves 54b are formed in the thin plates at a fixed angle with respect to the wave shape grooves.

It is preferable for the direction in which the wave-shaped grooves are formed to be set within the range of 15~60° with respect to the column axis, and for the direction in which the extremely small wave-shaped grooves 54b are formed to be set within the range of 15~90° with respect to the column axis. In addition, it is preferable for the length and height of the extremely small wave-shaped grooves 54b to be 0.3 to 3 mm. In addition, reference 54a indicates holes formed in the thin plate.

The promoting-fluid-dispersion type structured packing 55 shown in FIG. 6 has the feature of having a structure in which sections having extremely small grooves formed at a fixed angle with respect to the wave-shaped grooves and smooth sections which do not have these extremely small grooves are provided alternately in the wave-shaped thin plate. In addition, the reference 55a indicates holes formed in the thin plates.

In addition, when blocks of these promoting-fluid-dispersion type structured packing are packed in the distillation column, it is preferable to carry out the stacking by rotating the loading angle for the block in the column cross-section (i.e., the angle for disposing the wave-shaped thin plates) by a fixed angle for each block or each set of blocks, and thereby, the effect of achieving uniform dispersion is even further improved.

The detailed shape and structure of each of the various packings, their characteristics, and the characteristics of the packing method are introduced in Japanese Unexamined Patent Application, First Publication, No. Sho 58-26997, for example, as well as in the three references cited above.

In the present invention, of the two types of structured packing (non-promoting-fluid-dispersion type structured packing and promoting-fluid-dispersion type structured packing), it is particularly preferable to use promoting-fluid-dispersion type structured packing.

This is because when promoting-fluid-dispersion type structured packing is used, the flow of the descending liquid and the ascending vapor within the column readily becomes uniform, and it is possible to increase the efficiency of the vapor-liquid contact.

The specific surface area of the above-mentioned packing 11 is 350 m$^2$/m$^3$ to 1200 m$^2$/m$^3$, and preferably 500 m$^2$/m$^3$ and 750 m$^2$/m$^3$. When the specific surface area is less than 350 m$^2$/m$^3$, the vapor-liquid contact surface area becomes small and the efficiency of the vapor-liquid contact is reduced. When the specific surface area exceeds 1200 m$^2$/m$^3$, flooding tends to occur readily, therefore, this is not desirable.

In addition, in order for the vapor-liquid contact to proceed efficiently in distillation columns 1, 2, and 4, it is necessary to provide at least one collector and one distributor (not shown in the Figures) in each of the distillation columns 1, 2, and 4.

In the vicinity of the top of the distillation columns 1, 2, and 4, condensers 5, 7, and 9 are provided for cooling and liquefying at least a part of the gas which is drawn off from the top of each of these distillation columns 1, 2, and 4. In addition, in the vicinity of the bottom of the distillation columns 1, 2, and 4, reboilers 6, 8, and 10 are provided for heating and vaporizing at least a part of the liquid which is drawn off from the bottom of the distillation columns 1, 2, and 4.

The condensers 5, 7, and 9 have first conduits 5a, 7a, and 9a into which gas drawn off from the top of the distillation columns 1, 2, and 4 is introduced, and second conduits 5b, 7b, and 9b through which a medium for heat exchange passes. It is possible to cool and liquefy the above-mentioned drawn off gas by means of heat exchange with the medium for heat exchange.

As the condensers 5, 7, and 9, it is preferable to use plate fin type heat exchangers of counter current type or parallel flow type. Since the amount of the medium for heat exchange required for distillation is small, it is preferable for the condenser to be a non-immersion type which is provided outside of the distillation column.

The reboilers 6, 8, and 10 have first conduits 6a, 8a, and 10a into which liquid drawn off from the distillation columns 1, 2, and 4 is introduced, and second conduits 6b, 8b, and 10b through which the medium for heat exchange passes. It is possible to heat and vaporize the above-mentioned drawn off liquid by means of heat exchange with the medium for heat exchange.

As the reboilers 6, 8, and 10, it is preferable to use plate fin type heat exchangers of counter current type or parallel flow type.

The reboilers 6, 8, and 10 may be installed outside or inside the distillation columns 1, 2, and 4, but for the purpose of easy manufacture, it is preferable for the reboilers 6, 8, and 10 to be installed outside. When they are installed inside, the later-mentioned coil type can be used.

In addition, reference 12 indicates a blower. As this blower 12, as mentioned below, an ordinary temperature compressor, or a low temperature compressor can be used. In addition, in place of this blower 12, it is possible to use a fan.

FIG. 7 shows the structure and flow scheme of the reactor 3 which is a main component of the reactor system 3A. The reactor 3 shown here generally possesses a buffer tank 41 for temporarily storing oxygen gas which has passed through the second distillation column 2; a pipe 42 for carrying the oxygen gas to the buffer tank 41; a pipe 43 for carrying hydrogen (or deuterium) supplied from the supply source, not shown in the figure; a reaction chamber 44 in which the oxygen and the hydrogen supplied from these pipes 42 and 43 are reacted; and a controller 45.

The reaction chamber 44 consists of a burner 44a which mixes the oxygen and the hydrogen supplied to the inside of the reaction chamber 44, a heater 44b for heating the inside of the reaction chamber 44, and a cooling coil 44c for cooling the reaction products. In addition, reference 44d indicates the discharge outlet from which the reaction products within the reaction chamber are drawn off via a valve.

The controller 45 can control a flow control valve 42b by means of a signal based on the oxygen gas flow rate measured by an oxygen flow detector 42a installed in the pipe 42, and a signal based on a predetermined value, and can control the amount of oxygen supplied to the inside of the reactor 44 through the pipe 42. The controller 45 can control a flow control valve 43b by means of a signal based on the hydrogen gas flow rate measured by a hydrogen flow detector 43a installed in the pipe 43, and a signal based on a predetermined value, and can control the amount of hydrogen supplied to the inside of the reactor 44 through the pipe 43 In addition, the references 42c and 43c indicate check valves; the references 42d and 43d indicate flashback arresters; and the reference 44e indicates an exhaust pipe for emitting the extremely small amounts of unreacted gas in the reaction chamber 44 through a valve.

Figure 8:
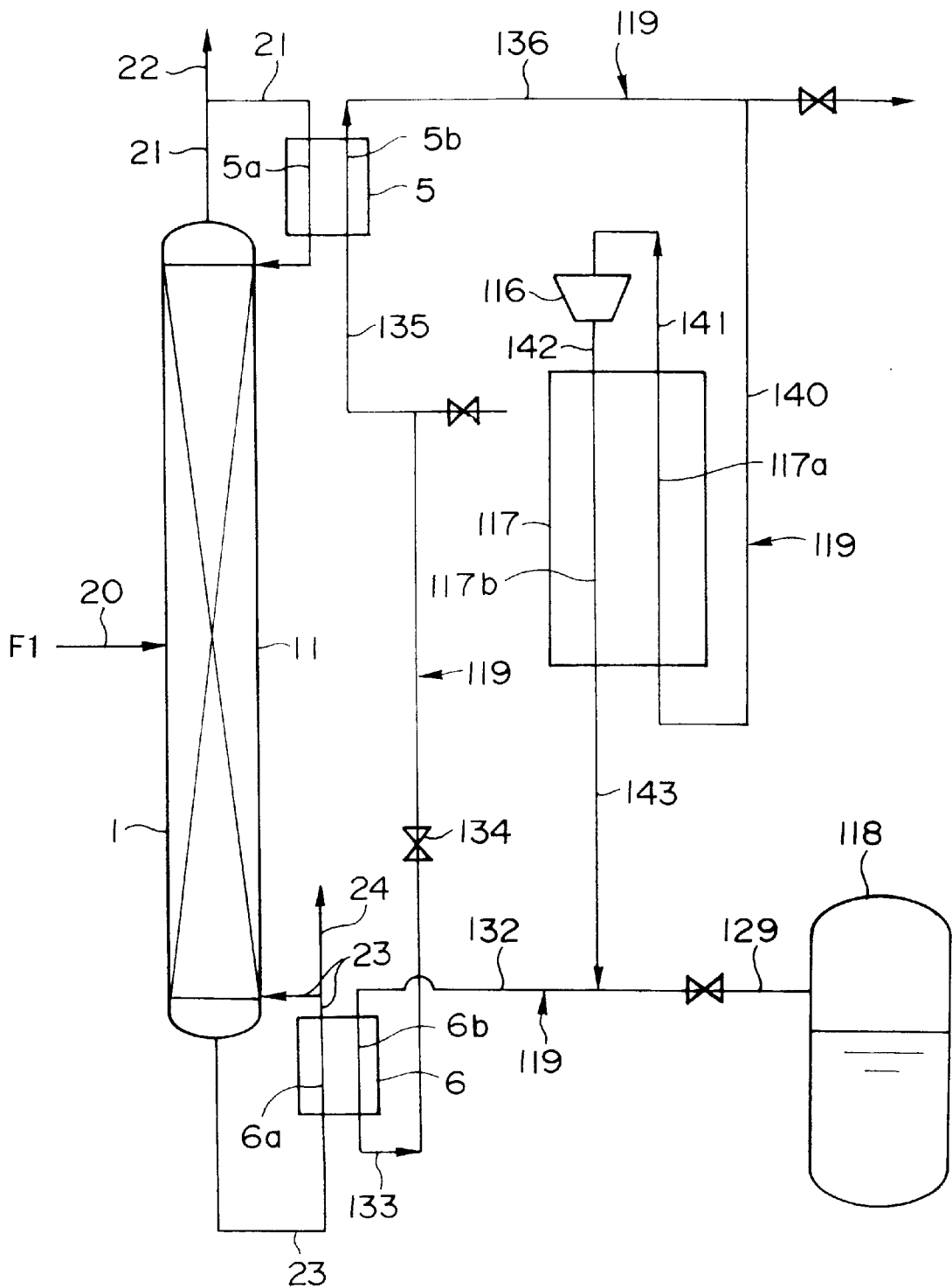
FIG. 8 is a schematic structural diagram showing the circulation system for the medium for heat exchange used in the apparatus shown in FIG. 1.

As shown in FIG. 8, the second conduit 5b of the condenser 5 and the second conduit 6b of the reboiler 6 are connected by means of a circulation system 119 for a medium for heat exchange. By means of the circulation of the medium for heat exchange within the circulation system 119, it is possible to vaporize the liquid contained within the first conduit 6a and to liquefy the gas within the first conduit 5a.

Circulation system 119 is provided with a blower 116 which is a circulation means for circulating the medium for heat exchange such as nitrogen, oxygen, or air within the circulation system 119, and a heat exchanger 117.

The above-mentioned circulation system 119 is a network possessing pipes 132, 133, 135, 136, 140, 141, 142, and 143 which are circulation pipes for circulating the medium for heat exchange between the condenser 5 and the reboiler 6.

As the blower 116, an ordinary temperature compressor can be used.

The heat exchanger 117 has a first conduit 117a and a second conduit 117b; and is such that heat exchange can occur between the medium for heat exchange in the first conduit 117a and the medium for heat exchange in the second conduit 117b. As the heat exchanger 117, the use of a plate fin type heat exchanger of the counter current type or the parallel flow type is preferable.

In addition, as the blower 116, it is possible to use a low temperature compressor, and in that case, it is not necessary to use a heat exchanger. In addition, it is possible to provide a liquid pump on the pipe 133 instead of using the blower 116. When using a liquid pump, the heat exchanger 117 is unnecessary, and power consumption can be reduced.

In addition, the second conduit 7b of the condenser 7 and the second conduit 8b of the reboiler 8 are connected by a circulation system (not shown in the figure) for a medium for heat exchange which has the same structure as the above-mentioned circulation system 119.

In addition, the second conduit 9b of the condenser 9 and the second conduit 10b of the reboiler 10 are connected by a circulation system (not shown in the figure) for a medium for heat exchange which has the same structure as the above-mentioned circulation system 119. As the medium for heat exchange used in this circulation system, water, freon, or the like are preferably used.

In the following, an embodiment of the method for producing heavy oxygen water of the present invention will be explained for an example in which the above-described apparatus is used.

First, oxygen gas starting material (first distillation column feed F1) is supplied to the distillation column 1 through a pipe 20 which is the feed section connected to the first distillation column 1.

As the above-mentioned oxygen gas starting material, it is preferable to use high purity oxygen. As the method for producing high purity oxygen, known methods which use apparatus for producing high purity oxygen such as those methods recited in, for example, Japanese Examined Patent Application, Second Publication No. Hei 4-13628; Japanese Unexamined Patent Application, First Publication, No. Sho 64-41748; Japanese Unexamined Patent Application, First Publication, No. Sho 64-46563; Japanese Unexamined Patent Application, First Publication, No. Hei 3-17488; and Japanese Examined Patent Application, Second Publication No. Hei 6-72740 can be used.

As the above-mentioned high purity oxygen, oxygen having a purity raised to 99.999% or greater by removing in advance impurities such as argon, hydrocarbons, krypton, xenon, fluorine compounds (such as perfluorocarbons) and the like is used.

Thereby, there are no components which hinder the enrichment of oxygen in the heavy isotopes of oxygen according to each of the processes of the present invention, and each of the processes proceeds well. In particular, the use of an oxygen starting material from which hydrocarbons have been removed is preferable from the point of view of safety.

The oxygen starting material gas supplied to the first distillation column 1 ascends within the distillation column 1, and when passing over the packing 11, vapor-liquid contact occurs with the reflux liquid (the descending liquid) discussed below, and distillation occurs.

In the oxygen gas starting material, those molecules ($^{16}O^{17}O$, $^{16}O^{18}O$, and the like) containing heavy isotopes have a higher boiling point and therefore condense readily, and the condensed liquid together with the reflux liquid form the descending liquid and flow downward within the distillation column 1.

For this reason, the oxygen gas ($^{16}O^{16}O$ enriched gas) having a reduced concentration of heavy isotopes of oxygen becomes concentrated at the top of the distillation column 1.

The enriched gas is drawn off from the distillation column 1 through the pipe 21, and a part thereof is introduced into the first conduit 5a of the condenser 5. Here, heat exchange occurs with the medium for heat exchange which is passing through the second conduit 5b, this part of the enriched gas condenses and is returned to the top of the distillation column 1 as reflux liquid.

The remaining portion of the above-mentioned enriched gas drawn off from the distillation column 1 through pipe 21 is discharged from the system as exhaust gas F3 through the pipe 22.

The reflux liquid which is introduced into the top of the first distillation column 1 forms the descending liquid and while flowing downward over the surface of the structured packing 11 to reach the bottom of the distillation column 1, it makes vapor-liquid contact with the oxygen gas starting material which is ascending within the distillation column 1. In this process of vapor-liquid contact, the descending liquid becomes enriched in heavy isotopes of oxygen.

The liquid which accumulates at the bottom of the first distillation column 1 (hereinafter referred to as bottom liquid) is drawn off from the distillation column 1 through the pipe 23 and is introduced into the first conduit 6a of the reboiler 6. Here, heat exchange occurs with the medium for heat exchange which is passing through the second conduit 6b, and the bottom liquid is vaporized, then it is drawn off from the reboiler 6, and a part thereof is returned again to the bottom of the distillation column 1 as reboiled gas, where it forms the ascending gas which ascends within the distillation column 1.

The remaining portion of the above mentioned gas drawn off from first conduit 6a of the reboiler 6 is introduced via the pipe 24 and the control valve 24a into the second distillation column 2 as first distillation column output gas F2 which is enriched in the heavy isotopes of oxygen.

The output gas F2 which is supplied to the second distillation column 2 ascends within the distillation column 2, and when passing over the packing 11, vapor-liquid contact occurs with the above-mentioned descending liquid, and distillation occurs.

The gas which is separated at the top of the column is drawn off from the distillation column 2 through the pipe 26, and a part thereof is introduced into the first conduit 7a of the condenser 7. Here, heat exchange occurs with the medium for heat exchange which is passing through the second conduit 7b, this part of the separated gas condenses and is returned to the top of the distillation column 2 as reflux liquid.

The remaining portion of the above-mentioned separated gas drawn off from the distillation column 2 through pipe 26 is introduced into the blower 12 (or a fan) through the pipe 27, then after being compressed, it is returned to first distillation column 1 through the pipe 28 as return gas F5.

The liquid which is returned to the second distillation column 2 as reflux liquid forms the descending liquid and while flowing downward over the surface of the structured packing 11 to reach the bottom of the distillation column 2, it makes vapor-liquid contact with the ascending gas within the distillation column 2.

In this process of vapor-liquid contact, the descending liquid becomes further enriched in heavy isotopes of oxygen.

The bottom liquid is drawn off from the distillation column 2 through the pipe 25 and is introduced into the first conduit 8a of the reboiler 8. Here, heat exchange occurs with the medium for heat exchange which is passing through the second conduit 8b, the bottom liquid is vaporized, and a part thereof is returned again to the bottom of the distillation column 2 as reboiled gas.

In the distillation operations used in the above-mentioned first and second oxygen distillation columns 1 and 2, it is preferable for the superficial F factor to be 0.5 m/s(kg/m$^3$)$^{1/2}$ or greater and 2.0 m/s(kg/m$^3$)$^{1/2}$ or less and more preferably 0.8 m/s(kg/m$^3$)$^{1/2}$ or greater and 1.7 m/s(kg/m$^3$)$^{1/2}$ or less.

When the superficial F factor is less than 0.5 m/s(kg/m$^3$)$^{1/2}$, the vapor-liquid mass transfer is small, and the efficiency of the vapor-liquid contact (the distillation efficiency) is reduced. In addition, when the superficial F factor exceeds 2.0 m/s(kg/m$^3$)$^{1/2}$, flooding tends to occur readily, therefore, this is not desirable.

The portion of the above mentioned gas which was drawn off from the second distillation column 2 through pipe 25 and was passed through reboiler 8 but which was not returned to the distillation column 2 is introduced via the pipe 29 and the control valve 29a into the reactor 3 of the reaction system 3A as second distillation column output gas F4.

The oxygen gas (output gas F4) which is introduced into the reactor 3 passes through the buffer tank 41 and is introduced into the reaction chamber 44 through pipe 42.

At the same time, hydrogen which is supplied from a supply source not shown in the figure is supplied to the reaction chamber 44 through the pipe 43.

At this time, a calculation is made by controller 45 based on a signal resulting from a predetermined value and a feedback signal based on the oxygen gas flow measured by means of an oxygen flow detector 42a, and based on the resulting signal, the flow control valve 42b is adjusted. In the same way, a calculation is made based on a signal resulting from a predetermined value and a feedback signal based on the hydrogen gas flow measured by means of a hydrogen flow detector 43a, and based on the resulting signal, the flow control valve 43b is adjusted. Thereby, the above-mentioned oxygen and hydrogen are supplied to the reaction chamber 44 in volumes close to stoichiometric volumes for the production of water.

The flow rates for the oxygen and the hydrogen supplied to the reaction chamber 44 are controlled so as to be as close as possible to normal stoichiometric volumes by means of the above-mentioned feedback control. However, even so, any gas introduced in excess can be periodically removed through exhaust pipe 44e via a valve, and therefore it is possible to prevent this gas from remaining within the reaction chamber 44.

In order to increase enrichment of the heavy oxygen water in H$_2$$^{17}$O and H$_2$$^{18}$O obtained by means of the water distillation process mentioned below, and to suppress enrichment in HD$^{16}$O, it is advantageous to use hydrogen in which the concentration of deuterium (D) has been reduced compared with naturally abundant hydrogen as the hydrogen supplied to the reaction chamber 44.

As methods for the production of hydrogen having a reduced concentration of deuterium, the following two methods can be mentioned.

The first method is a method in which hydrogen as starting material is passed through a hollow metal membrane comprising palladium-silver alloy and, in this case, the hydrogen which permeates from the inside of the hollow membrane to the outside of the hollow membrane is collected. Since deuterium does not permeate through the above-mentioned membrane readily, the concentration of deuterium in the collected hydrogen is lower.

In this method, a coil shaped tube (having, for example, a length of approximately 5.8 m; an external diameter of approximately 1.33 mm; and a thickness of approximately 0.12 mm) of a palladium alloy containing approximately 25% silver, for example, is heated to a temperature of 300 to 500° C., hydrogen starting material is supplied to the tube at pressure of approximately 65 bar (1000 psia), and the gas which permeates through the tube can be collected.

The details of this method are reported in Frank Jackerman and George J. Koskinas, Journal of Chemical Engineering Data, Vol. 17, No. 1, 1972, pp 51 to 55, "Permeation of Hydrogen and Deuterium Through Palladium-Silver Alloy".

The second method is a method in which hydrogen starting material is stored in a hydrogen storing alloy (for example, Pd, La—Ni type alloy, Ti—Ni type alloy, and Fe—Ni—Ti type alloy), then the stored hydrogen is desorped from the above-mentioned alloy, in this situation, only the hydrogen which is desorped relatively quickly is collected. In this process as well, it is possible to obtain hydrogen in which the concentration of deuterium is lower.

Alternatively, as the hydrogen which is supplied to the reactor 3, it is possible to use hydrogen which is enriched in deuterium. As hydrogen highly enriched in deuterium, it is possible to use commercially available product which is produced and enriched by means of distillation and is charged in cylinders. Alternatively, hydrogen highly enriched in deuterium can be obtained by a method in which hydrogen as starting material is stored in a hydrogen storing alloy, then the hydrogen is desorped and the hydrogen which is desorped at a relatively later period of time can be collected.

By means of using hydrogen which is highly enriched in deuterium, it is possible to obtain heavy oxygen water which is highly enriched in D$_2$$^{17}$O and D$_2$$^{18}$O (of the three components of D$_2$$^{16}$O, D$_2$$^{17}$O and D$_2$$^{18}$O) by means of the water distillation process mentioned below.

In this case, it is possible to use a method in which it is possible to obtain oxygen highly enriched in heavy isotopes ($^{17}$O$^{17}$O, $^{17}$O$^{18}$O and $^{18}$O$^{18}$O) by means of the electrolysis of a part of the second distillation column output gas F4 in an electrolysis tank not shown in the figures, and it is possible to collect the hydrogen produced during the electrolysis, and to reuse this as the hydrogen supplied to the reactor 3. By means of the reuse of hydrogen in this way, it is possible to reduce operation costs.

Moreover, in the present invention, the hydrogen obtained by means of the electrolysis of the water distillation column output liquid F7 mentioned below can be collected and reused as the hydrogen supplied to the reactor 3.

After the above-mentioned oxygen and hydrogen which are supplied to the reaction chamber 44 have been mixed by the burner 44a, they are jetted into the reaction chamber 44, and ignited by heater 44b, and by means of this reaction, water is formed.

The larger part of this formed water is condensed by means of cooling coil 44c, then it is drawn off from the reaction chamber 44 through discharge outlet 44d, and supplied to the water distillation column 4 as water distillation column feed F6 through the pipe 30.

The water fed to the water distillation column 4 forms the descending liquid and while flowing downward to reach the bottom of the distillation column 4, it makes vapor-liquid contact with the ascending gas within the distillation column 4.

In this process of vapor-liquid contact, the descending liquid becomes enriched in heavy isotope molecules such as H$_2$$^{18}$O, H$_2$$^{17}$O HD$^{16}$O, HD$^{17}$O and HD$^{18}$O.

The bottom liquid is drawn off from the distillation column 4 through the pipe 31 and a part thereof is introduced into the first conduit 10a of the reboiler 10. Here, heat exchange occurs with the medium for heat exchange which is passing through the second conduit 10b, the bottom liquid is vaporized, and is returned again to the distillation column 4 as reboiled gas through the pipe 31.

The gas which is returned to the water distillation column 4 through the pipe 31 ascends within the distillation column 4 to reach the top of the distillation column, and when passing over the packing 11, vapor-liquid contact occurs with the above-mentioned descending liquid.

In this process of vapor-liquid contact, the ascending gas becomes enriched in the light molecules of $H_2^{16}O$.

The gas which reaches the top of the distillation column and which has a higher concentration of $H_2^{16}O$ is drawn off from the water distillation column 4 through the pipe 33, and a part thereof is released from the system as exhaust gas F8 through the pipe 34. The other part is introduced into the first conduit 9a of the condenser 9, heat exchange occurs with the medium for heat exchange which is passing through the second conduit 9b, it condenses and is returned to the water distillation column 4.

The part of the bottom liquid drawn off from the water distillation column 4 through the pipe 31 which was not introduced into the reboiler 10 is drawn off from the system as water distillation column output liquid F7 through the pipe 32. In this way, heavy oxygen water is obtained which is highly enriched in the above-mentioned components.

In addition, by means of the electrolysis of the obtained heavy oxygen water, it is possible to collect heavy oxygen. Thereby, it is possible to obtain an oxygen product which is highly enriched in heavy isotopes.

Next, the flow of the medium for heat exchange which passes through the second conduit 5b of the condenser 5 and the second conduit 6b of the reboiler 6 will be explained with reference to FIG. 8.

As the medium for heat exchange, it is possible to use nitrogen, oxygen, air or the exhaust gas of an air liquefying separation unit.

The medium for heat exchange in storage tank 118 is drawn off from the storage tank 118 through pipe 129 in a gaseous state, it passes along pipe 132 and flows into the second conduit 6b of the reboiler 6, heat is exchanged with the bottom liquid (liquefied oxygen) within the first conduit 6a, and the medium for heat exchange condenses.

The medium for heat exchange which has passed through the reboiler then passes along pipe 133 and the pressure is reduced at the valve 134, and apart thereof passes along pipe 135 in a gaseous state, flows into second conduit 5b of the condenser 5, and exchanges heat with the oxygen gas in the first conduit 5a, and is vaporized.

The vaporized medium for heat exchange passes along pipes 136 and 140 and flows into the first conduit 117a of the heat exchanger 117, and here it is heated through heat exchange with the medium for heat exchange within the second conduit 117b, then it is introduced into the blower 116, and is pressurized. As the means for pressurization, by providing a liquid pump in the path of the pipe 133, it is possible to reduce the power consumption of the blower 116.

The medium for beat exchange pressurized by the blower 116 is introduced into second conduit 117b of heat exchanger 117, where it exchanges beat with the medium for heat exchange within the first conduit 117a and is cooled, then it passes along pipe 143, is returned to the above-mentioned pipe 132, and circulates through the above-described path.

By means of the use and circulation of this medium for heat exchange in this way, it is possible to make use of the cooling of the medium for heat exchange without waste, to suppress energy losses to a minimum, and to reduce operating costs.

In addition, in this circulation system, it is possible to circulate the medium for heat exchange by providing only a low temperature compressor or by providing a pump in pipe 133, without providing the above-mentioned heat exchanger 117.

In the circulation system of the above-mentioned water distillation column system 4A, water, freon, or the like can be used as the medium for heat exchange.

In the above-mentioned method, after enriching an oxygen starting material in the heavy isotopes of oxygen by means of cryogenic distillation using first and second distillation columns 1 and 2, water is formed which is highly enriched in the heavy isotopes of oxygen by means of adding hydrogen to the enriched product in the reactor 3 and reacting them. Then, heavy oxygen water is obtained by enriching this water in the above-mentioned heavy isotopes of oxygen by means of distillation. Consequently, with the above-mentioned method, it is possible to obtain the effects shown below.

(1) In the above-mentioned method, since water which has been formed using oxygen enriched in advance in the heavy isotopes of oxygen ($^{17}O$ and $^{18}O$) is subjected to water distillation, it is possible to obtain heavy oxygen water which is more highly enriched in $H_2^{17}O$ and $H_2^{18}O$ and which does not contain deuterium compared with a situation in which water distillation alone is used.

In contrast, when only water distillation is used, water ($HD^{16}O$ and the like) which contains deuterium and the light oxygen isotope ($^{16}O$) readily becomes mixed into the obtained heavy oxygen water and the degree of enrichment in the heavy isotopes of oxygen within the heavy oxygen water is easily reduced.

(2) Compared with a situation in which only water distillation is used, since it is possible to reduce the concentration of $HD^{16}O$ with respect to the concentration of $H_2^{17}O$ and $H_2^{18}O$, and a small enrichment ratio is achieved for $H_2^{17}O$ and $H_2^{18}O$, it is possible to prevent the $HD^{16}O$ from hindering the enrichment in $H_2^{17}O$ and $H_2^{18}O$ and, therefore, to obtain heavy oxygen water containing $H_2^{17}O$ and $H_2^{18}O$ at high concentrations. It is possible to achieve enrichment in $H_2^{18}O$ to a high concentration (99% or greater).

(3) In general, in the oxygen distillation method, since the latent heat of vaporization of oxygen which is the starting material is small, it is possible to reduce energy consumption and the size of the apparatus compared with a water distillation method.

In the above-mentioned method, since water which is formed using oxygen enriched in the heavy isotopes of oxygen is subjected to water distillation, even when the amount of water subjected to the water distillation is small, it is possible to collect a sufficient amount of the heavy isotopes of oxygen.

Consequently, when compared with a situation in which only a water distillation method is used, it is possible to reduce the size of the apparatus for the water distillation column system, in other words, the distillation column, the heat exchanger (the reboiler, condenser, etc.), and the like, and it is possible to reduce the apparatus costs and operation costs. (4) In the above-mentioned method, since a water distillation method is used, it is possible to collect heavy isotopes of oxygen at a high concentration when compared to a situation in which enrichment in the heavy isotopes of oxygen is carried out by means of an oxygen distillation method alone.

More specifically, when using only an oxygen distillation method, even when enrichment in $^{16}O^{18}O$, or $^{16}O^{17}O$ approaches 100%, it is still only possible to achieve enrichment to approximately 50% when the atoms of $^{18}O$ and $^{17}O$ are considered. Compared with this, in the above-mentioned method, it is possible to obtain a product which is highly enriched in the heavy isotopes by means of increasing the height of the column.

(5) In addition, by means of using a distillation column in which structured packing is used, it is possible to reduce the liquid hold-up volume and, therefore, it is possible to reduce the time required for start-up of the apparatus. In addition, it is possible to reduce the operation costs associated therewith.

Furthermore, by using structured packing, the efficiency of the vapor-liquid contact which occurs within the distillation column is increased, and thereby it is possible to increase the efficiency of the isotope enrichment.

In addition, by using structured packing with which the pressure loss is low, it is possible to set the pressure within the column at a lower level. For this reason, it is possible to carry out the distillation under conditions in which the relative volatility of each of the components is comparatively large, and thereby the efficiency of the distillation can be increased.

(6) By means of using, as the structured packing, a promoting-fluid-dispersion type structured packing with which the vapor-liquid contact takes place while mixing of the liquid and/or the vapor in a direction at right angles to the main flow direction within the distillation column is promoted, it is possible to increase the efficiency of the vapor-liquid contact, and thereby it is possible to improve the efficiency of the distillation even further.

(7) By means of using hydrogen in which the concentration of deuterium is reduced as the hydrogen which is added to the above-mentioned enriched product, it is possible to reduce the amount of heavy water ($HD^{16}O$, and the like) produced, and thereby it is possible to obtain heavy oxygen water which is highly enriched in the $H_2^{17}O$ and $H_2^{18}O$.

(8) By means of using hydrogen which is highly enriched in deuterium as the hydrogen added to the above-mentioned enriched product, it is possible to obtain heavy oxygen water which is highly enriched in $D_2^{17}O$ and $D_2^{18}O$.

In addition, the apparatus of the present invention is not limited to the above-mentioned structure, and it is possible for the above-mentioned distillation columns 1, 2 and 4 to be divided into a plurality of columns.

Figure 9:
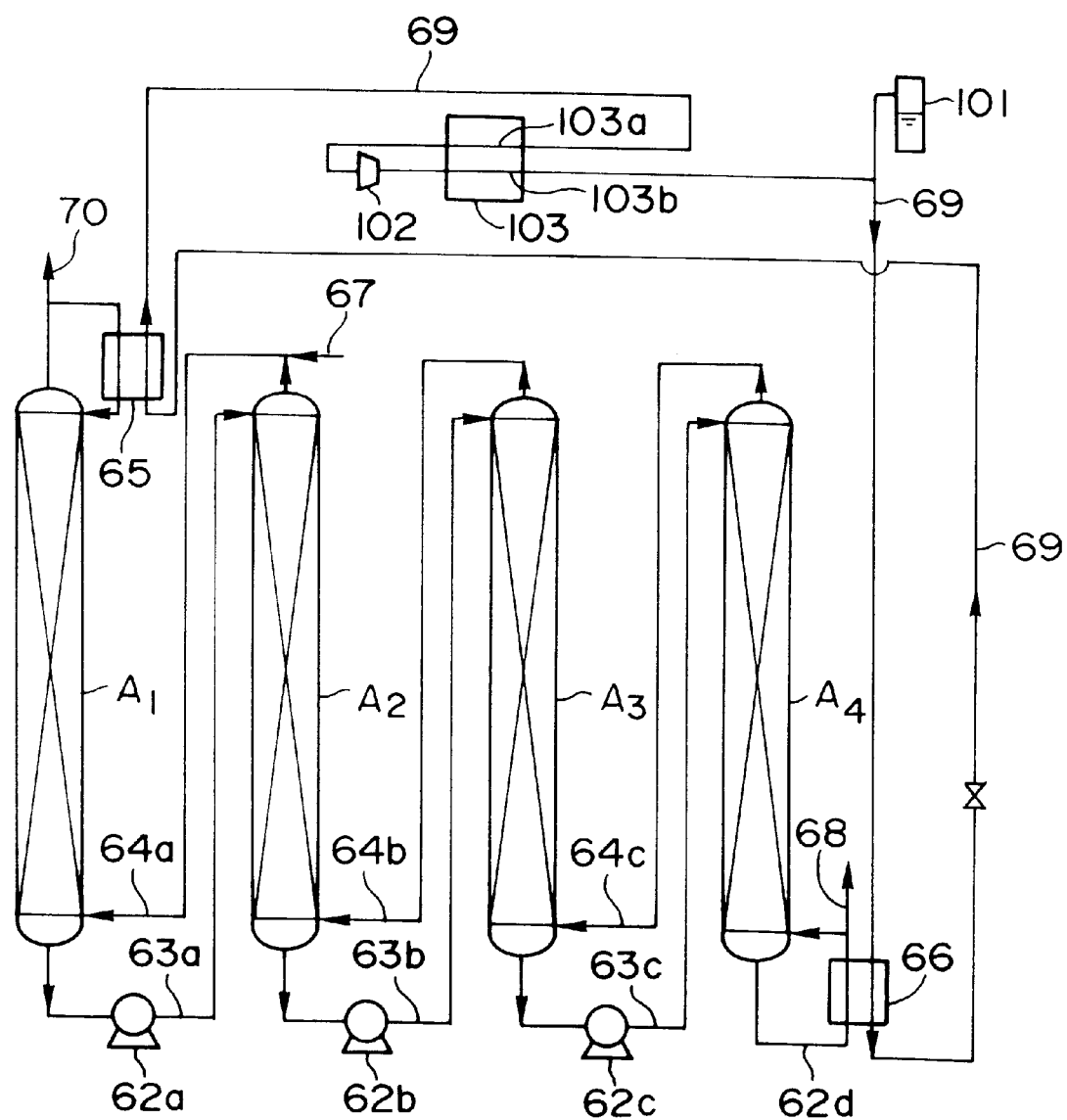
FIG. 9 is a schematic structural diagram showing an example of a variation of the distillation column used in the apparatus for producing heavy oxygen water of the present invention.

FIG. 9 shows an example of a case in which the above-mentioned distillation column has been divided. In the present invention, the plurality of distillation columns shown here can be used in place of the distillation column 1 in the apparatus shown in FIG. 1, for example.

The apparatus shown here is provided with four distillation columns (first column $A_1$ to fourth column $A_4$). The bottoms of columns $A_k$ (k is a natural number of 3 or less) and the tops of columns $A_{k+1}$ are respectively connected in series by means of pipes 63a to 63c and via liquid transfer means 62a to 62c such as a liquid transfer pump for sending the output liquid from columns $A_k$ to columns $A_{k+1}$. In addition, the lower parts of the columns $A_1$ and the tops of the columns $A_{k+1}$ are respectively connected by pipes 64a to 64c which guide output gas from the columns $A_{k+1}$ to the columns $A_k$. In addition, a condenser 65 is provided in the vicinity of the top of the first column $A_1$, and a reboiler is provided in the vicinity of the bottom of the fourth column $A_4$.

In addition, in the same way as for the above-mentioned circulation system 119, the circulation system indicated by reference 69 is able to circulate a medium for heat exchange output from storage tank 101 for the medium for heat exchange through the reboiler 66, the condenser 65, the first conduit 103a of the heat exchanger 103, the blower 102 which is the circulation means, and the second conduit 103b of the heat exchanger 103.

As the blower 102, either of an ordinary temperature compressor or a low temperature compressor can be used. When a low temperature compressor is used as the blower 102, a heat exchanger 103 is not necessary.

When using the above-mentioned apparatus, the gas as starting material passes along the pipes 67 and 64a which are the feed section and is introduced into first column $A_1$. Here, distillation is carried out, then a part of the gas which has separated at the top of the column is drawn off and another part thereof is liquefied by means of the condenser 65 and returned to the first column A, and at the same time, the bottom liquid is introduced into the second column $A_2$ through the pipe 63a.

Next, the gas (hereinafter referred to as top gas) obtained from the top of the second column $A_2$ passes through the pipe 64a and is returned to the first column $A_1$ and the bottom liquid from the second column $A_2$ passes along the pipe 63b and is introduced into third column $A_3$.

Next, the top gas obtained in the third column $A_3$ passes along pipes 64b and is returned to the second column $A_2$, and the bottom liquid from the third column $A_3$ passes along the pipe 63c and is introduced into the fourth column $A_4$.

Next, the top gas obtained in the fourth column $A_4$ passes along pipes 64c and is returned to the third column $A_3$, and the bottom liquid from the fourth column $A_4$ passes along the pipe 62d, passes through the reboiler 66 and is vaporized, then it passes along pipe 68 and is drawn off from the system.

In the above-mentioned apparatus, the pipe 67 which is the feed section for the gas starting material is connected to the pipe 64a, however, it is not limited to this, the pipe which forms the feed section may also be connected to the pipes 64b and 64c in accordance with the conditions such as the isotope concentration of the gas starting material. In addition, it could be connected to the middle section of each column.

In addition, by means of inserting the blower into the discharge piping 70 for the top gas from the first column $A_1$ or the pipes 64a, 64b and 64c, it is possible to carry out operations with reduced pressure in each column. In addition, reduced pressure operation (vacuum operation) is also possible.

Thereby, the relative volatility of each of the components is increased and the yield can be improved. In addition, the separation efficiency for isotopes is increased, and it is possible to reduce the height of the columns.

By using a plurality of columns in this way, it is possible to reduce the height of the columns, and to compactly construct the apparatus as a whole, thereby making reductions in plant costs possible.

The apparatus shown in FIG. 9 is provided with four columns, however, it is not limited to this, it can be provided with a plurality (n) of columns ($A_1 \sim A_n$), and the bottoms of the columns $A_k$ (k is a natural number of n−1 or lower) and the tops of columns $A_{k+1}$ are respectively connected by pipes through a liquid transfer means which sends liquid output from columns $A_k$ to columns $A_{k+1}$, and the lower parts of columns $A_k$ and the tops of columns $A_{k+1}$ are respectively connected by pipes for guiding gas output from column $A_{k+1}$ to column $A_k$. The number of distillation columns can be from 2 to 100 for example.

In addition, in this case as well, a condenser is provided at the top of the column $A_1$, and a reboiler is provided at the bottom of column $A_{k+1}$.

Figure 10:
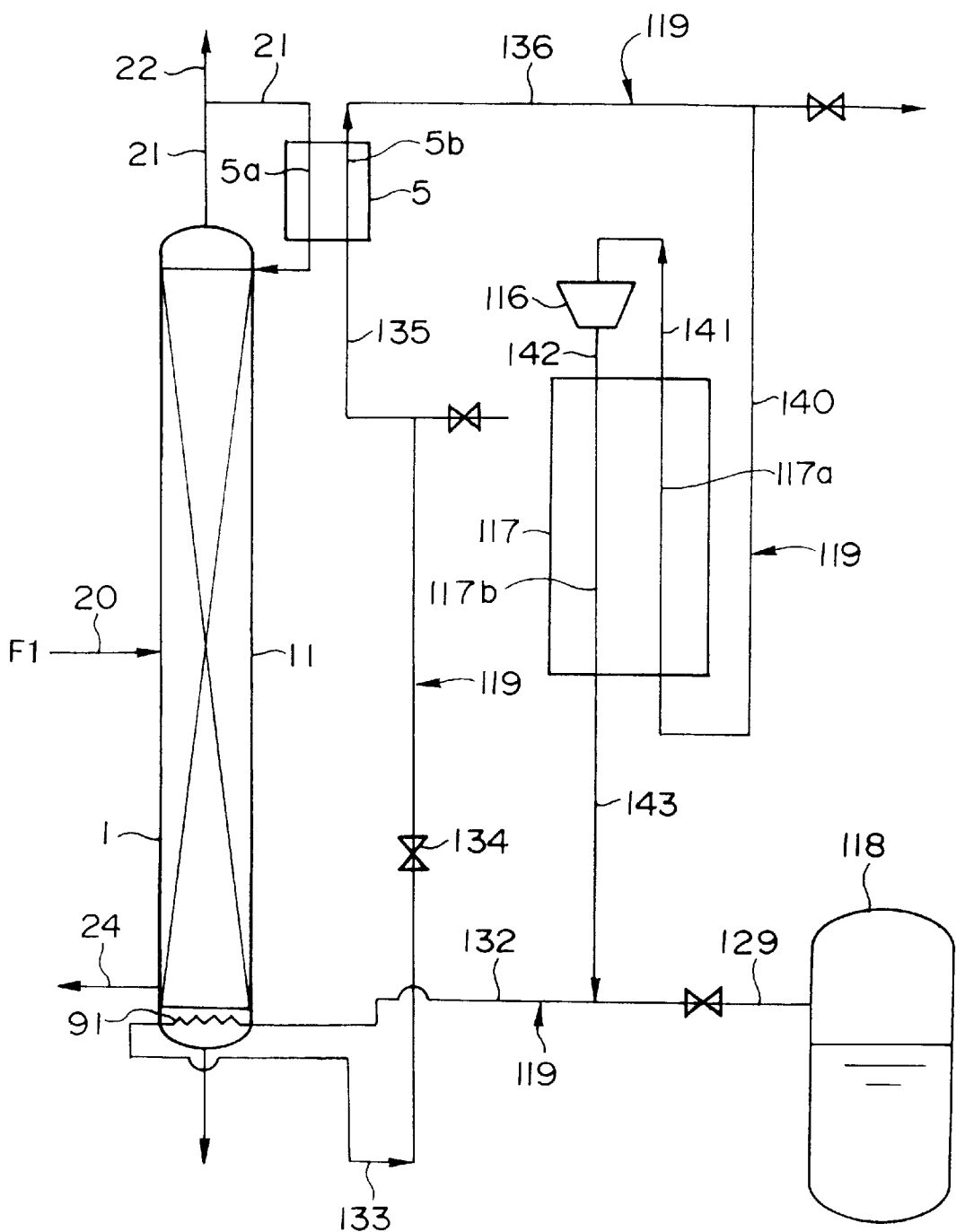
FIG. 10 is a schematic structural diagram showing an example of the reboiler used in the apparatus for producing heavy oxygen water of the present invention.

In addition, FIG. 10 shows an apparatus in which an internal coil-type reboiler 91 is provided within the column in place of the reboiler 6 which is provided outside of the column in the apparatus shown in FIG. 8.

The coil-type reboiler 91 is provided internally within the bottom of the distillation column 1, and is such that the medium for heat exchange flows through the column and, as a result, the bottom liquid of the distillation column 1 can be heated by means of heat exchange with the medium for heat exchange and a part thereof can be vaporized.

In the apparatus of the present invention, in order to increase safety, it is possible to provide the reactor 3 with a diluent gas supply means for mixing a diluent gas such as an inert gas (argon gas, or the like) with the oxygen and the hydrogen supplied to the reaction chamber 44 through pipes 42 and 43. In this case, it is necessary to provide a condensation separator for separating the above-mentioned diluent gas from the reaction products output from the reaction chamber 44. In addition, a diluent gas circulation system may be provided in order to reuse the diluent gas.

Furthermore, in place of the heater 44b, it is possible to use a material (for example, a Ni, Cu, Pt or Pd type material) which has catalytic activity with respect to the above-mentioned reaction. In addition, independent of the heater 44b, by means of placing the above-mentioned catalyst within the reaction chamber 44, the reactivity of the oxygen and the hydrogen within the reaction chamber 44 can be increased.

In addition, when using a heater as the ignition source, it is preferable from the point of view of safety that during operation the heater always be maintained in a red heat condition, so that the gas mixture is always ignited as it is jetted from burner.

In addition, when not using a diluent gas and when not using a burner 44a, a spark generating means (not shown in the figures) can be provided in place of the burner 44a, ignition can be carried out by means of a spark, and thereby the above-mentioned oxygen and hydrogen will react. In this situation, two sealed cylinder type reaction chambers can be provided, and thereby it is possible to carry out a continuous operation by switching between these two reaction chambers.

Next, the results of a computer simulation conducted for a situation in which heavy oxygen water was produced using the apparatus shown in FIG. 1 will be explained.

The distillation theory used in designing the distillation column of the present invention and the distillation theory used in this simulation uses a rate model related to mass transfer, in other words, H.E.T.P. (height equivalent to a theoretical plate) or an equilibrium stage model were not used.

In the distillation theory using this rate model, the mass flux N is expressed in the following way using the diffusion flux J and convection ρv.

$$N = J_{GS} + \rho_{GS} V_{GS} \omega_{GS}$$

In addition, as the formula for the correlation related to mass transfer, it is possible to give the following.

$$Sh_{GS}(J_{GS}/N) = A_1 Re_G^{A_2} \cdot Sc_{GS}^{A_3}$$

Here, Sh, Re, Sc are respectively defined by the following formulas.

$$Sh_{GS} = ND/(\rho_{GS} D_{GS} \Delta \omega_{GS})$$

$$Re_G = \rho_G U_G D/\mu_G$$

$$Sc_{GS} = \mu_{GS}/(\rho_{GS} D_{GS})$$

N: mass transfer [kg/(m².s)]
J: diffusion flux [kg/(m².s)]
ρ: density [kg/m³]
v: velocity [m/s]
ω: concentration [kg/kg]
Sh: Sherwood number [−]
Re: Reynolds number [−]
Sc: Schmidts number [−]
$A_1, A_2, A_3$: constants determined depending on the system
Subscript G: vapor phase
Subscript S: vapor-liquid interface The advantages with this rate model are that it is possible to correctly predict the mass transfer of an intermediate component within a multi-component system, and it does not give unrealistic results such as the negative values obtained with H.E.T.P. or Murphree's plate efficiency which occurs when making calculations by means of the equilibrium stage model.

The above-mentioned model is explained in detail in J. A. Wesselingh, "Non-equilibrium modeling of distillation", IChemE Distillation and Absorption '97, vol. 1, pp. 1–21 (1997).

Figure 11:
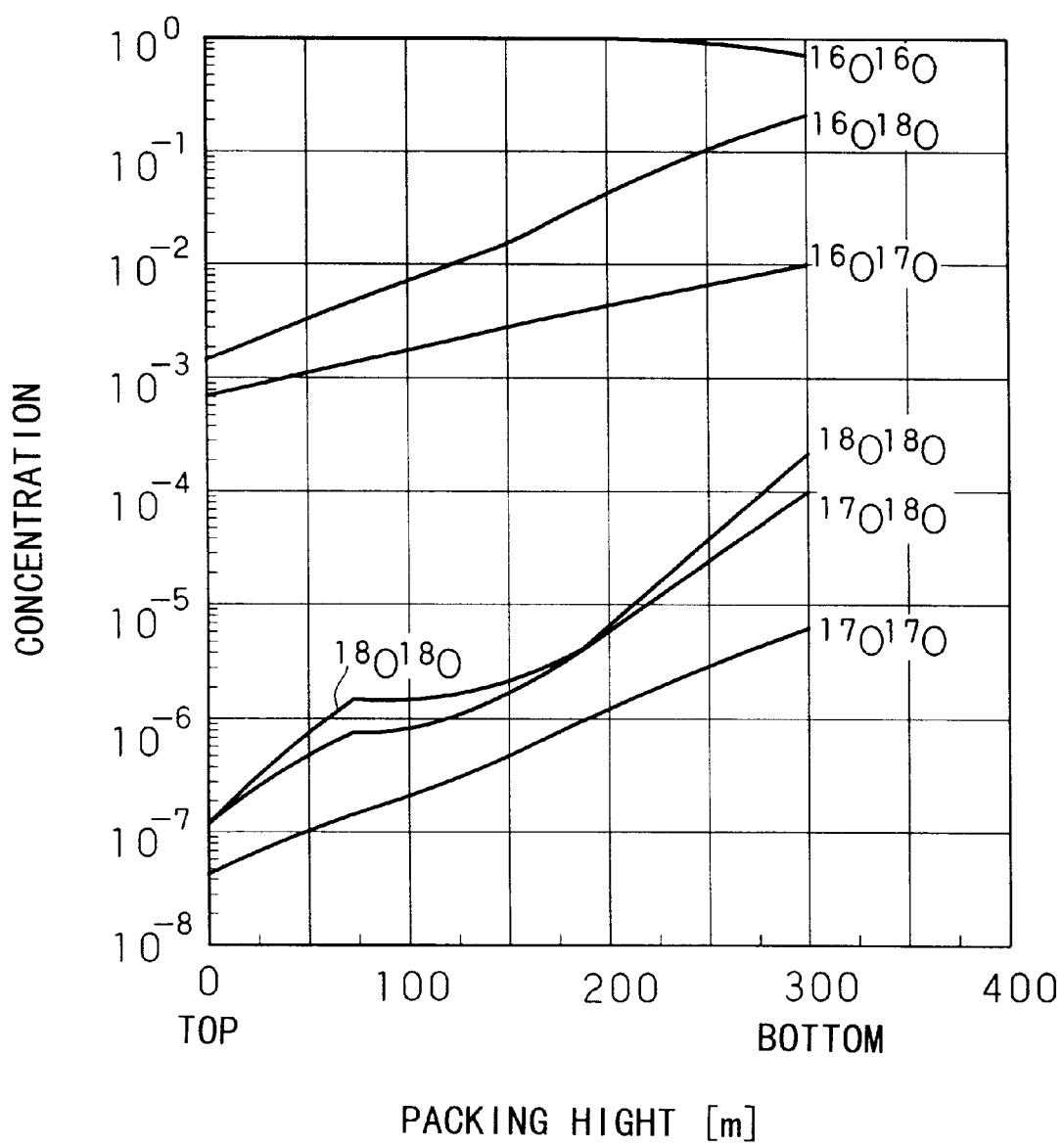
FIG. 11 is a graph showing the results of a simulation of the production of heavy oxygen water for a situation in which the apparatus shown in FIG. 1 was used as an example.
Figure 12:
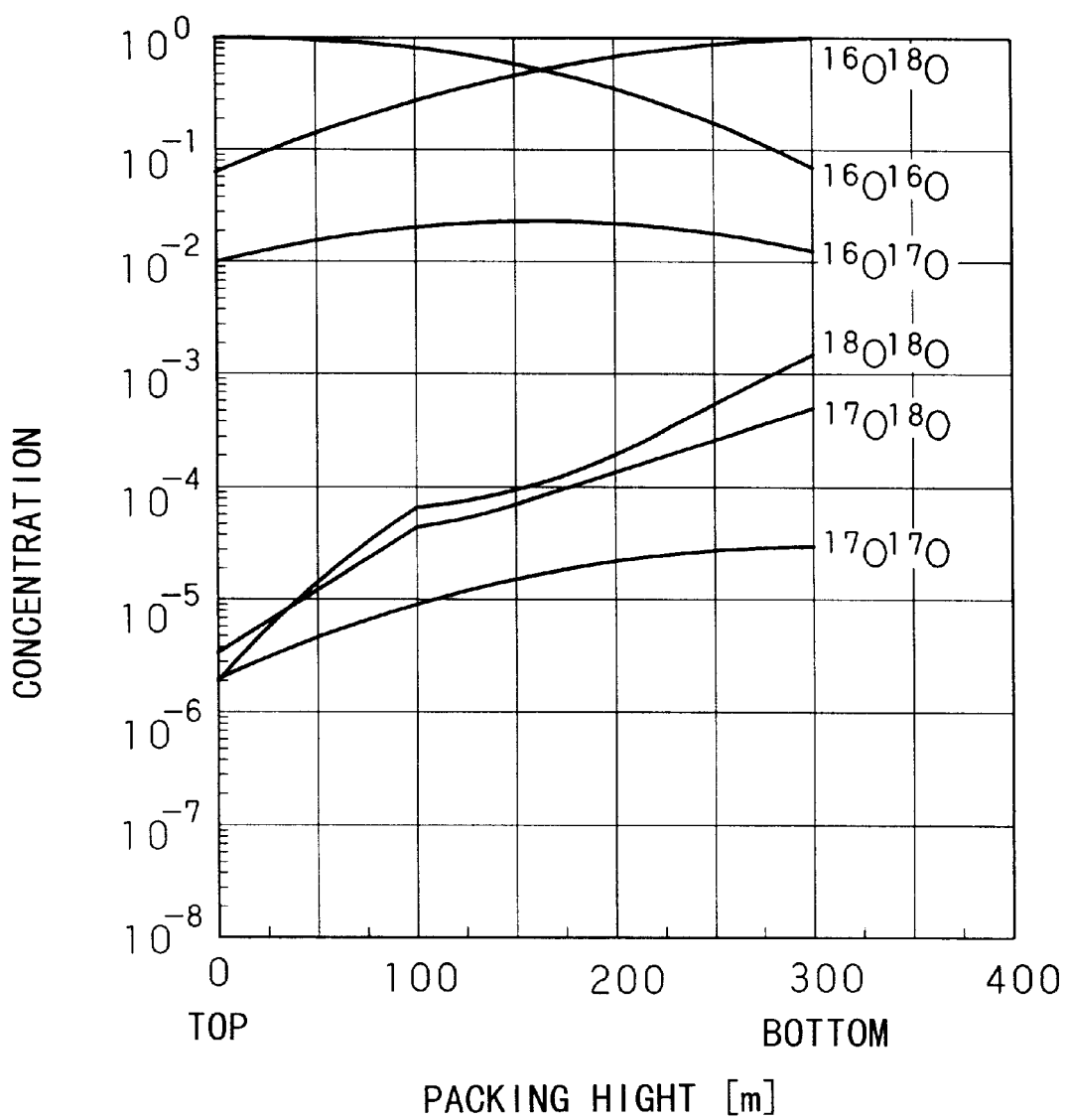
FIG. 12 is a graph showing the results of a simulation of the production of heavy oxygen water for a situation in which the apparatus shown in FIG. 1 was used as an example.
Figure 13:
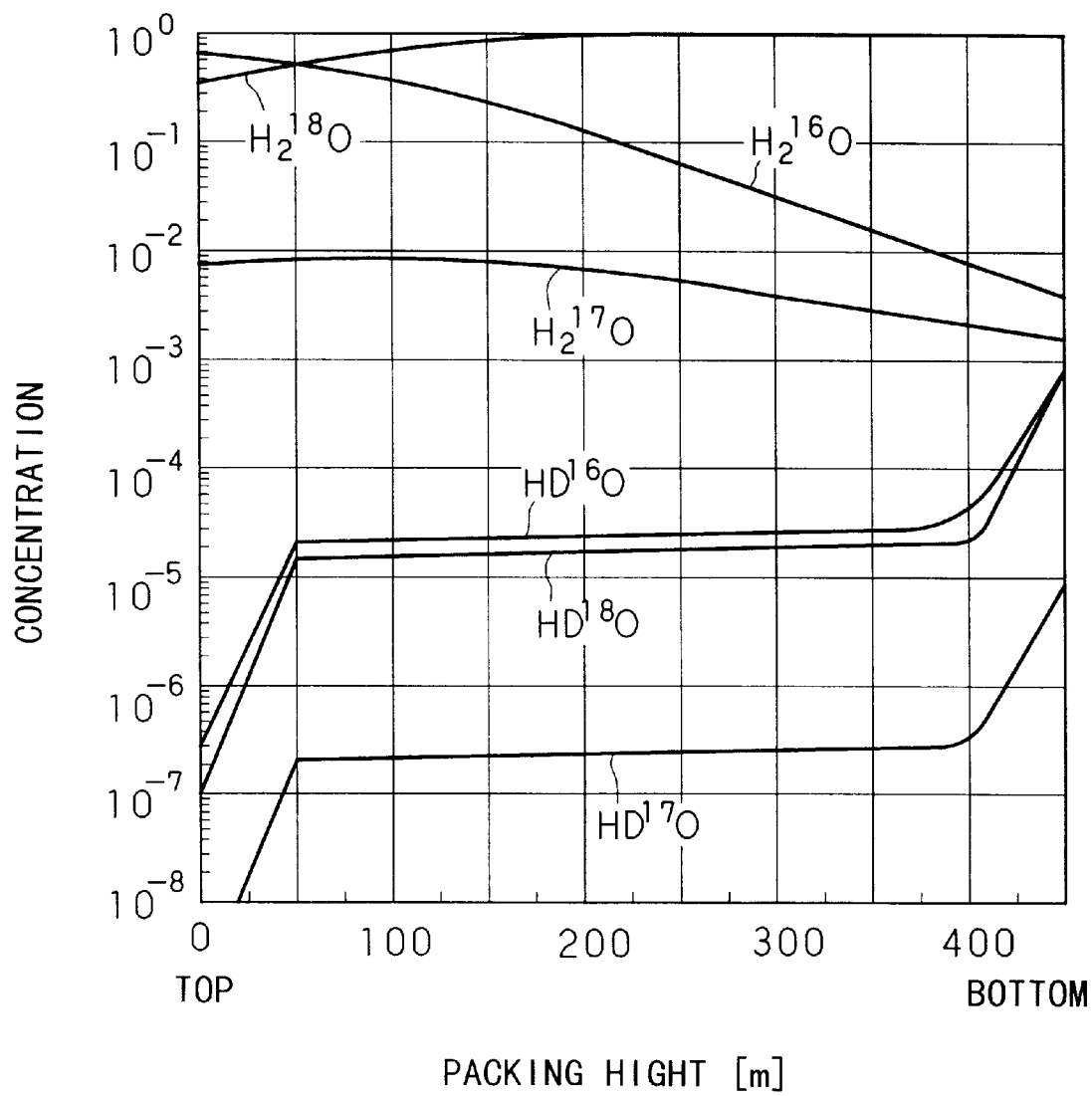
FIG. 13 is a graph showing the results of a simulation of the production of heavy oxygen water for a situation in which the apparatus shown in FIG. 1 was used as an example.
Figure 14:
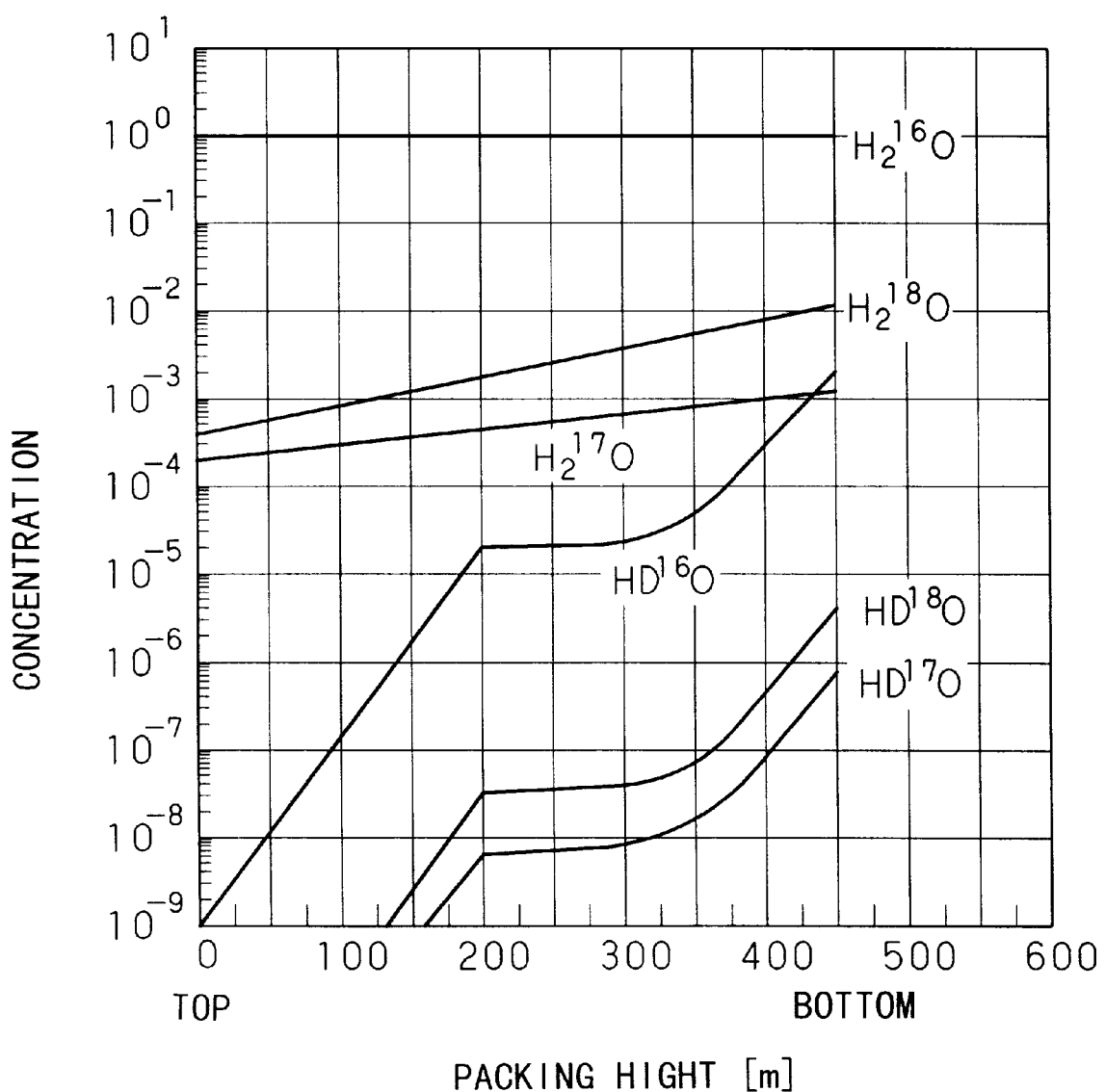
FIG. 14 is a graph showing the results of a simulation of the production of heavy oxygen water for a situation in which a conventional apparatus was used as an example.

The results of the simulation conducted using the above-mentioned model are shown in Tables 2 and 3 and in FIGS. 11 to 13.

Tables 2 and 3 show the pressure, flow rate, and concentration of isotopes for the gas or liquid obtained in each process.

FIG. 11 to FIG. 13 show the concentration distribution for each of the isotopes of oxygen or water in the distillation columns 1, 2, and 4 respectively.

In this simulation, oxygen comprises six isotopes ($^{16}O^{16}O$, $^{16}O^{17}O$, $^{16}O^{18}O$, $^{17}O^{17}O$, $^{17}O^{18}O$, and $^{18}O^{18}O$).

In addition, the water is presumed to contain the six isotopes without the $D_2O$ components ($D_2^{16}O$, $D_2^{17}O$, $D_2^{18}O$) for which the abundance ratio is small.

In addition, as the hydrogen supplied to the reactor 3, natural hydrogen in which each of the isotopes is present at natural abundance ratios was used.

TABLE 1

|  | First Distillation Column | Second Distillation Column | Third Distillation Column |
|---|---|---|---|
| Feed | oxygen | oxygen | water |
| Specific surface area of the packing ($m^2/m^3$) | 500 | 500 | 500 |
| Internal diameter of the distillation column | 1.780 | 0.290 | 0.187 |
| Feed location (distance from the top of the column) (m) | 70 | 100 | 50 |
| Packing height (m) | 300 | 300 | 450 |
| Amount of reboiler/condenser heat load (kW) | 1900 | 52 | 96 |
| Pressure (bar) | 1.1~1.7 | 1.1~1.8 | 1.1~2.3 |
| Superficial F factor ($m/s(kg/m^3)^{1/2}$) | 1.4~1.6 | 1.5~1.6 | 1.5~1.9 |

(The packing height does not include the height of the liquid collector or the liquid distributor.)

TABLE 2

|  | First Column Feed F1 | First Column Output Gas F2 | First Column Exhaust Gas F3 | Second Column Output Gas F4 | Second Column Return Gas F5 |
|---|---|---|---|---|---|
| Pressure (bar) | 1.2 | 1.7 | 1.1 | 1.8 | 1.1 |
| Flow rate (mol/s) | 1.000 | 0.0148 | 0.997 | $2.95 \times 10^{-3}$ | 0.0118 |
| $^{16}O^{16}O$ Concentration (−) | 0.995 | 0.764 | 0.998 | 0.0672 | 0.938 |
| $^{16}O^{17}O$ Concentration (−) | $7.38 \times 10^{-4}$ | 0.0101 | $7.06 \times 10^{-4}$ | 0.0117 | $9.67 \times 10^{-3}$ |
| $^{16}O^{18}O$ Concentration (−) | $4.07 \times 10^{-3}$ | 0.226 | $1.36 \times 10^{-3}$ | 0.919 | 0.0524 |
| $^{17}O^{17}O$ Concentration (−) | $1.37 \times 10^{-7}$ | $7.60 \times 10^{-6}$ | $4.58 \times 10^{-8}$ | $3.09 \times 10^{-5}$ | $1.77 \times 10^{-6}$ |
| $^{17}O^{18}O$ Concentration (−) | $1.51 \times 10^{-6}$ | $9.63 \times 10^{-5}$ | $1.26 \times 10^{-7}$ | $4.69 \times 10^{-4}$ | $3.08 \times 10^{-6}$ |
| $^{18}O^{18}O$ Concentration (−) | $4.16 \times 10^{-6}$ | $2.75 \times 10^{-4}$ | $1.24 \times 10^{-7}$ | $1.37 \times 10^{-3}$ | $1.77 \times 10^{-6}$ |

(First Column: First Distillation Column 1; Second Column: Second Distillation Column 2)

TABLE 3

|  | Third Column Feed F6 | Third Column Output Liquid F7 | Third Column Exhaust Gas F8 |
|---|---|---|---|
| Pressure (bar) | 1.3 | 2.3 | 1.1 |
| Flow rate (mol/s) | $5.90 \times 10^{-3}$ | $1.18 \times 10^{-3}$ | $4.72 \times 10^{-3}$ |
| $H_2^{16}O$ Concentration (−) | 0.533 | $4.03 \times 10^{-3}$ | 0.665 |
| $H_2^{17}O$ Concentration (−) | $6.09 \times 10^{-3}$ | $1.57 \times 10^{-3}$ | $7.22 \times 10^{-3}$ |
| $H_2^{18}O$ Concentration (−) | 0.461 | 0.993 | 0.328 |
| $HD^{16}O$ Concentration (−) | $1.66 \times 10^{-4}$ | $8.30 \times 10^{-4}$ | $2.46 \times 10^{-7}$ |
| $HD^{17}O$ Concentration (−) | $1.90 \times 10^{-6}$ | $9.50 \times 10^{-6}$ | $1.75 \times 10^{-9}$ |
| $HD^{18}O$ Concentration (−) | $1.44 \times 10^{-4}$ | $7.19 \times 10^{-4}$ | $8.82 \times 10^{-8}$ |

(Third Column: Water Distillation Column 4)

From Tables 2 and 3 and from FIGS. 11 to 13, by means of the above-mentioned apparatus, it was possible to obtain heavy oxygen water enriched in $H_2^{18}O$ to a concentration of 99% or greater as the water distillation column output liquid F7 output from the water distillation column 4.

As explained above, it is possible to obtain the effects shown below by means of the present invention.

(1) In the present invention, since water which has been formed using oxygen enriched in advance in the heavy isotopes of oxygen ($^{17}O$ and $^{18}O$) is used, it is possible to obtain heavy oxygen water which is more highly enriched in $H_2^{17}O$ and $H_2^{18}O$ and which does not contain deuterium compared with a situation in which water distillation alone is used.

(2) Compared with a situation in which only water distillation is used, since it is possible A to reduce the concentration of $HD^{16}O$ with respect to the concentration of $H_2^{17}O$ and $H_2^{18}O$, and a small enrichment ratio is achieved for $H_2^{17}O$ and $H_2^{18}O$, it is possible to prevent the $HD^{16}O$ from hindering the enrichment in $H_2^{17}O$ and $H_2^{18}O$ and, therefore, to obtain heavy oxygen water containing $H_2^{17}O$ and $H_2^{18}O$ at high concentrations.

(3) Even when the amount of water which is subjected to the water distillation is small, it is possible to collect a sufficient amount of the heavy isotopes of oxygen.

Consequently, when compared with a situation in which only a water distillation method is used, it is possible to reduce the size of the apparatus for the water distillation column system, in other words, the distillation column, the heat exchanger (the reboiler, condenser, etc.), and the like, and it is possible to reduce the apparatus costs and operation costs.

(4) In the above-mentioned method, since a water distillation method is used, it is possible to collect heavy isotopes of oxygen at a high concentration when compared to a situation in which enrichment in the heavy isotopes of oxygen is carried out by means of an oxygen distillation method alone.

More specifically, when using only an oxygen distillation method, even when enrichment in $^{16}O^{18}O$, and $^{16}O^{17}O$ approaches 100%, it is still only possible to achieve enrichment to approximately 50% when the atoms of $^{18}O$ and $^{17}O$ are considered. Compared with this, in the above-mentioned method, it is possible to obtain a product which is highly enriched in the heavy isotopes by means of increasing the height of the column.

(5) In addition, by means of using the distillation column in which structured packing is used, it is possible to reduce the liquid hold-up volume and, therefore, it is possible to reduce the time required for start-up of the apparatus. In addition, it is possible to reduce the operation costs associated therewith. Furthermore, the efficiency of the vapor-liquid contact is increased, and thereby it is possible to increase the efficiency of the isotope enrichment. In addition, it is possible to carry out the distillation under conditions in which the relative volatility of each of the components is comparatively large, and thereby the efficiency of the distillation can be increased.

(6) By means of using, as the structured packing, a promoting-fluid-dispersion type structured packing with which the vapor-liquid contact takes place while mixing of the liquid and/or the vapor in a direction at right angles to the main flow direction within the distillation column is promoted, it is possible to increase the efficiency of the vapor-liquid contact, and thereby it is possible to improve the efficiency of the distillation even further.

(7) By means of using hydrogen in which the concentration of deuterium is reduced as the hydrogen which is added to the above-mentioned enriched product, it is possible to reduce the amount of heavy water ($HD^{16}O$, and the like) produced, and thereby it is possible to obtain in heavy oxygen water which is highly enriched in the $H_2^{17}O$ and $H_2^{18}O$.

(8) By means of using hydrogen which is highly enriched in deuterium as the hydrogen added to the above-mentioned enriched product, it is possible to obtain heavy oxygen water which is highly enriched in $D_2^{17}O$ and $D_2^{18}O$.

What is claimed is:

1. A method of producing heavy oxygen water comprising:
   enriching oxygen in heavy isotopes of oxygen by means of cryogenic distillation of an oxygen starting material containing the heavy isotopes of oxygen; and
   forming water containing a high concentration of the heavy isotopes of oxygen by adding hydrogen to an enriched product and reacting them.

2. A method of producing heavy oxygen water according to claim 1, wherein the heavy isotopes of oxygen are $^{17}O$ and $^{18}O$.

3. A method of producing heavy oxygen water according to claim 1, wherein the cryogenic distillation of tie oxygen is carried out using a distillation column packed with structured packing.

4. A method of producing heavy oxygen water according to claim 1 comprising:
   enriching oxygen in the molecular isotopes of oxygen of $^{16}O^{18}O$, $^{16}O^{17}O$, $^{17}O^{17}O$, $^{17}O^{18}O$, and $^{18}O^{18}O$,
   wherein, as the method for the cryogenic distillation of the oxygen, a distillation method is used which comprises:
   supplying the oxygen starting material to the distillation column packed with the structured packing;
   carrying out vapor-liquid contact between a descending liquid and an ascending vapor mainly on the surface of the structured packing within the distillation column, at which time the liquid and the vapor flow in mutually opposite directions over the surface of the structured packing along a main flow direction which is along a direction of the column axis, and at the same time, mixing of the liquid and the vapor in a direction at right angles to the main flow direction is promoted and mass transfer is accomplished.

5. A method of producing heavy oxygen water according to claim 1 comprising:
   enriching heavy oxygen water containing heavy isotopes of oxygen $^{17}O$ and $^{18}O$,
   wherein, a distillation method is used which comprises:
   supplying the formed water to a distillation column packed with structured packing;
   bringing about vapor-liquid contact within the distillation column between a descending liquid and an ascending vapor mainly on a surface of the structured packing, at which time, the liquid and the vapor flow in mutually opposite directions over the surface of the structured packing along a main flow direction which is along a direction of the column axis, and at the same time, mixing of the liquid and the vapor in a direction at right angles to the main flow direction is promoted and mass transfer is accomplished.

6. A method of producing heavy oxygen water according to claim 1, wherein
   hydrogen in which the concentration of deuterium has been reduced to less than the concentration present in natural hydrogen in advance is used as the hydrogen added to the enriched product.

7. A method of producing heavy oxygen water according to claim 6, wherein
   the hydrogen in which the concentration of deuterium has been reduced is obtained by means of supplying hydrogen starting material to a hollow metal membrane of palladium-silver alloy and causing the hydrogen starting material to permeate through the membrane.

8. A method of producing heavy oxygen water according to claim 6, wherein
   the hydrogen in which the concentration of deuterium has been reduced is obtained by means of a method in which the hydrogen starting material is stored in a hydrogen storing alloy, then the stored hydrogen is recovered by desorption from the alloy.

9. A method of producing heavy oxygen water according to claim 1, wherein
   hydrogen which is enriched in deuterium in advance is used as the hydrogen added to the enriched product.

10. A method of producing heavy oxygen water according to claim 9, wherein
    water which is formed by reacting the hydrogen enriched in deuterium and the enriched product is electrolyzed, heavy isotope molecules of oxygen are produced and the deuterium is recovered and reused.

11. A method of producing heavy oxygen water comprising:
    enriching oxygen in heavy isotopes of oxygen by means of cryogenic distillation of an oxygen starting material which already contains the heavy isotopes of oxygen;
    forming water containing a high concentration of the heavy isotopes of oxygen by adding hydrogen to an enriched product and reacting them; and
    producing the heavy oxygen water enriched in the heavy isotopes of oxygen by means of distillation of the formed water.

12. A method of producing heavy oxygen water according to claim 11, wherein the heavy isotopes of oxygen are $^{17}O$ and $^{18}O$.

13. A method of producing heavy oxygen water according to claim 11, wherein the cryogenic distillation of the oxygen or the distillation of the formed water are carried out using a distillation column packed with structured packing.

14. A method of producing heavy oxygen water according to claim 11 comprising:
    enriching oxygen in the molecular isotopes of oxygen of $^{16}O^{18}O$, $^{16}O^{17}O$, $^{17}O^{17}O$, $^{17}O^{18}O$, and $^{18}O^{18}O$,
    wherein, as the method for the cryogenic distillation of the oxygen, a distillation method is used which comprises:
    supplying the oxygen starting material to the distillation column packed with the structured packing;
    carrying out vapor-liquid contact between a descending liquid and an ascending vapor mainly on the surface of the structured packing within the distillation column, at which time the liquid and the vapor flow in mutually opposite directions over the surface of the structured packing along a main flow direction which is along a direction of the column axis, and at the same time, mixing of the liquid and the vapor in a direction at right angles to the main flow direction is promoted and mass transfer is accomplished.

15. A method of producing heavy oxygen water according to claim 11 comprising:

enriching heavy oxygen water containing heavy isotopes of oxygen $^{17}O$ and $^{18}O$, wherein, as the method for the distillation of the formed water, a distillation method is used which comprises:

supplying the formed water to a distillation column packed with structured packing;

bringing about vapor-liquid contact within the distillation column between a descending liquid and an ascending vapor mainly on a surface of the structured packing, at which time, the liquid and the vapor flow in mutually opposite directions over the surface of the structured packing along a main flow direction which is along a direction of the column axis, and at the same time, mixing of the liquid and the vapor in a direction at right angles to the main flow direction is promoted and mass transfer is accomplished.

16. A method of producing heavy oxygen water according to claim 11, wherein hydrogen in which the concentration of deuterium has been reduced to less than the concentration present in natural hydrogen in advance is used as the hydrogen added to the enriched product.

17. A method of producing heavy oxygen water according to claim 11, wherein hydrogen which is enriched in deuterium in advance is used as the hydrogen added to the enriched product.

18. A method of producing heavy oxygen water according to claim 11, wherein the cryogenic distillation of the oxygen and the distillation of the formed water are carried out using a distillation column packed with structured packing.

19. An apparatus for producing heavy oxygen water comprising:

an oxygen distillation column system for enriching oxygen in heavy isotopes of oxygen by means of cryogenic distillation of an oxygen starting material containing the heavy isotopes of oxygen; and a reactor system for forming water highly enriched in the heavy isotopes of oxygen by means of adding hydrogen to an enriched product and causing them to react.

20. An apparatus for producing heavy oxygen water according to claim 19, wherein the oxygen distillation column system comprise one or a plurality of distillation columns packed with structured packing.

21. An apparatus for producing heavy oxygen water according to claim 20, wherein the structured packing has a structure and form such that vapor-liquid contact occurs within the distillation columns between a descending liquid and an ascending vapor mainly on a surface of the structured packing, at which time, the liquid and the vapor flow in mutually opposite directions over the surface of the structured packing along a main flow direction (which is along a direction of the column axis) and simultaneously, mixing of the liquid and the vapor in a direction perpendicular to the main flow direction is promoted.

22. An apparatus for producing heavy oxygen water according to claim 20, wherein a specific surface area of the packing of the oxygen distillation column system is from 350 $m^2/m^3$ to 1200 $m^2/m^3$.

23. An apparatus for producing heavy oxygen water according to claim 20 wherein the oxygen distillation column system comprise a plurality (n) of distillation columns ($A_1$~$A_n$), and the bottoms of columns $A_k$ (k: an natural number of n−1 or lower) and the tops of columns $A_{k+1}$ are connected by pipes through liquid transfer means which send liquid output from the columns $A_k$ to the columns $A_{k+1}$, and lower parts of the columns $A_k$ and the tops of the columns $A_{k+1}$ are connected by pipes for guiding vapor output from the columns $A_{k+1}$ to the columns $A_k$.

24. An apparatus for producing heavy oxygen water according to claim 23, wherein the top of a column $A_1$ is provided with a condenser and the bottom of column $A_{k+1}$ is provided with a reboiler.

25. An apparatus for producing heavy oxygen water comprising:

an oxygen distillation column system for enriching oxygen in heavy isotopes of oxygen by means of cryogenic distillation of an oxygen starting material already containing the heavy isotopes of oxygen;

a reactor system for forming water highly enriched in the heavy isotopes of oxygen by means of adding hydrogen to an enriched product and causing them to react; and a water distillation column system for producing water enriched in the heavy isotopes of oxygen by means of distillation of the formed water.

26. An apparatus for producing heavy oxygen water according to claim 20, wherein at least one distillation column system selected from the oxygen distillation column system or the water distillation column system comprise one or a plurality of distillation columns packed with structured packing.

27. An apparatus for producing heavy oxygen water according to claim 26, wherein the structured packing has a structure and form such that vapor-liquid contact occurs within the distillation columns between a descending liquid and an ascending vapor mainly on a surface of the structured packing, at which time, the liquid and the vapor flow in mutually opposite directions over the surface of the structured packing along a main flow direction (which is along a direction of the column axis) and simultaneously, mixing of the liquid and the vapor in a direction perpendicular to the main flow direction is promoted.

28. An apparatus for producing heavy oxygen water according to claim 26, wherein a specific surface area of the packing of the oxygen distillation column system or the water distillation column system is from 350 $m^2/m^3$ to 1200.

29. An apparatus for producing heavy oxygen water according to claim 28, wherein a specific surface area of the packing of the oxygen distillation column system or the water distillation column system is from 500 $m^2/m^3$ to 750 $m^2/m^3$.

30. An apparatus for producing heavy oxygen water according to claim 26 wherein at least one distillation column system selected from the oxygen distillation column system or the water distillation column system comprise a plurality (n) of distillation columns ($A_1$~$A_n$), and the bottoms of columns $A_k$ (k: an natural number of n−1 or lower) and the tops of columns $A_{k+1}$ are connected by pipes through liquid transfer means which send liquid output from the columns $A_k$ to the columns $A_{k+1}$, and lower parts of the columns $A_k$ and the tops of the columns $A_{k+1}$ are connected by pipes for guiding vapor output from the columns $A_{k+1}$ to the columns $A_k$.

31. An apparatus for producing heavy oxygen water according to claim 30, wherein the top of a column $A_1$ is provided with a condenser and the bottom of column $A_{k+1}$ is provided with a reboiler.

32. An apparatus for producing heavy oxygen water according to claim 25, wherein at least one distillation column system selected from the oxygen distillation column system and the water distillation column system comprise one or a plurality of distillation columns packed with structured packing.

* * * * *